(12) United States Patent
Kroepfl et al.

(10) Patent No.: US 8,189,925 B2
(45) Date of Patent: May 29, 2012

(54) GEOCODING BY IMAGE MATCHING

(75) Inventors: Michael Kroepfl, Redmond, WA (US);
Eyal Ofek, Redmond, WA (US);
Yonatan Wexler, Redmond, WA (US);
Donald Wysocki, Austin, TX (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 12/478,569

(22) Filed: Jun. 4, 2009

(65) Prior Publication Data

US 2010/0310182 A1 Dec. 9, 2010

(51) Int. Cl.
*G06K 9/62* (2006.01)
*G06K 9/00* (2006.01)
*G06K 9/36* (2006.01)

(52) U.S. Cl. ......... 382/216; 382/113; 382/287; 382/289

(58) Field of Classification Search .................. 382/113, 382/190, 195, 209, 216, 284–289; 702/14, 702/16
See application file for complete search history.

(56) References Cited

U.S. PATENT DOCUMENTS

| | | | | |
|---|---|---|---|---|
| 6,151,411 A * | 11/2000 | Saito | .............................. | 382/203 |
| 7,162,338 B2 * | 1/2007 | Goncalves et al. | .............. | 701/23 |
| 7,576,753 B2 * | 8/2009 | Saund et al. | .................. | 345/619 |
| 8,116,575 B1 * | 2/2012 | Saisan et al. | .................. | 382/225 |
| 2002/0103639 A1 * | 8/2002 | Chang et al. | .................. | 704/223 |
| 2003/0138146 A1 * | 7/2003 | Johnson et al. | .............. | 382/190 |
| 2006/0095540 A1 * | 5/2006 | Anderson et al. | ............. | 709/217 |
| 2006/0233461 A1 * | 10/2006 | Ma et al. | ....................... | 382/285 |
| 2008/0243573 A1 * | 10/2008 | Nasser et al. | ..................... | 705/7 |
| 2008/0313179 A1 * | 12/2008 | Trepess et al. | .................... | 707/5 |
| 2008/0319655 A1 * | 12/2008 | Vande Velde | ................ | 701/208 |
| 2009/0292732 A1 * | 11/2009 | Manolescu | ............... | 707/104.1 |
| 2010/0310177 A1 * | 12/2010 | Xiong et al. | .................. | 382/201 |
| 2011/0216090 A1 * | 9/2011 | Woo et al. | ..................... | 345/633 |

OTHER PUBLICATIONS

Plane Detection Using Affine Homography ftp://users.dca.ufrn.br/artigos/CBA08a.pdf.
Probabilistic Matching of Line Segments for Their Homography http://figment.cse.usf.edu/~sfefilat/data/papers/MoBT4.2.pdf.
Invariant Features from Interest Point Groups http://www.cs.ubc.ca/labs/lci/papers/docs2002/brown-02.pdf.
External Research & Programs http://research.microsoft.com/en-us/um/redmond/about/collaboration/awards/virtualearth_2007_awards.aspx.

(Continued)

*Primary Examiner* — Jason M Repko
*Assistant Examiner* — Mia M Thomas
(74) *Attorney, Agent, or Firm* — Shook Hardy & Bacon, LLP

(57) ABSTRACT

Embodiments of the present invention relate to systems, methods and computer storage media for associating a known geographic location with a known identity. Feature matching, of at least two images, is performed in at least two iterations. The iterations are based on an orientation of feature vectors associated with points of interest in each image. A geometric model is applied to the matched points of interest to improve the matched pairs. Two images are identified as being related. As a result, the known geographic location is associated with the known identity. Additional embodiments include augmenting feature vectors with a coordinate location of a related point of interest based on a geometric model. Further, an exemplary embodiment includes an additional matching iteration based on the augmented feature vectors. In an exemplary embodiment, the feature matching utilizes a Scale-Invariant Feature Transform (SIFT).

20 Claims, 20 Drawing Sheets

OTHER PUBLICATIONS

Detecting and Matching Repeated Patterns for Automatic Geo-tagging in Urban Environments http://www.cse.psu.edu/~lubliner/papers/schindler08cvpr.pdf.

Online Geocoding and Evaluation of Large Scale Imagery without GPS http://www.ifp.uni-stuttgart.de/publications/phowo07/260Foerstner.pdf.

* cited by examiner

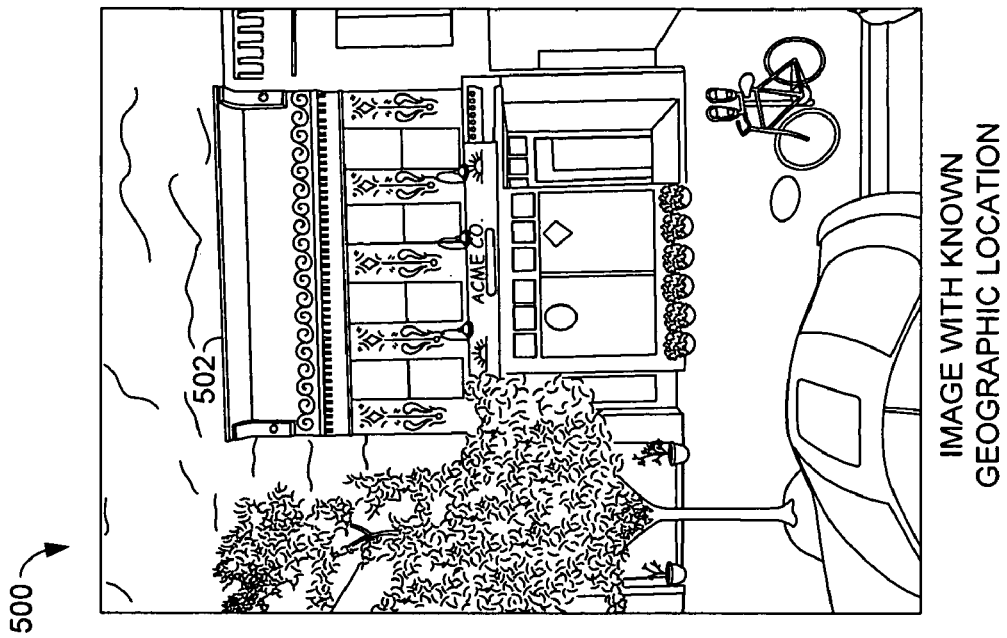
FIG. 5. IMAGE WITH KNOWN GEOGRAPHIC LOCATION
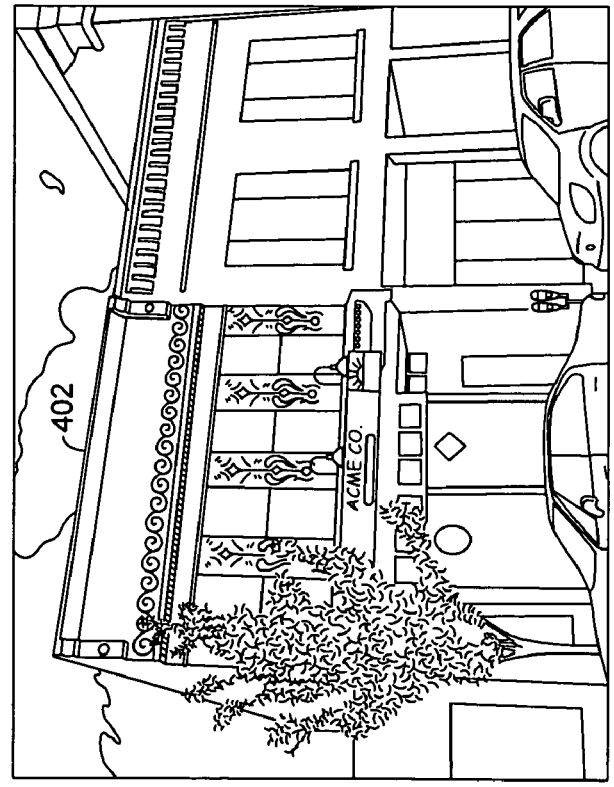
FIG. 4. IMAGE WITH KNOWN IDENTITY

MATCHED POINTS OF INTEREST BASED ON ORIGINAL FEATURE VECTORS

MATCHED POINTS OF INTEREST BASED ON ORIGINAL FEATURE VECTORS WITH OUTLIERS REMOVED

MATCHED POINTS OF INTEREST BASED ON AUGMENTED FEATURE VECTORS

GEOCODING BY IMAGE MATCHING

BACKGROUND

Typically, results of a location-based search at a street-level scale tend to be limited in accuracy. In some situations, an entity, such as a business, is approximated in location based on a known street address, but the approximation may result from an interpolation across an entire city block. Therefore, the search results for the business at the street-level scale may appear that the business is located at a location other than an actual location.

The above-described deficiencies of today's location-based search results are merely intended to provide an overview of some of the problems of conventional systems and are not intended to be exhaustive. Other deficiencies and corresponding benefits of some of the various nonlimiting embodiments may become further apparent upon review of the following detailed description.

SUMMARY

Embodiments of the present invention relate to systems, methods and computer storage media for associating a known geographic location with a known identity. Feature matching, of at least two images, is performed in at least two iterations based on feature vector orientations. A geometric model is applied to the matched points of interest to improve the matched pairs. Two images are identified as being related. As a result, the known geographic location is associated with the known identity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 depicts an exemplary first image having a known identity, the first image is in accordance with an embodiment of the present invention;

FIG. 5 depicts an exemplary second image having a known geographic location, the second image is in accordance with an embodiment of the present invention;

DETAILED DESCRIPTION

Figure 1:
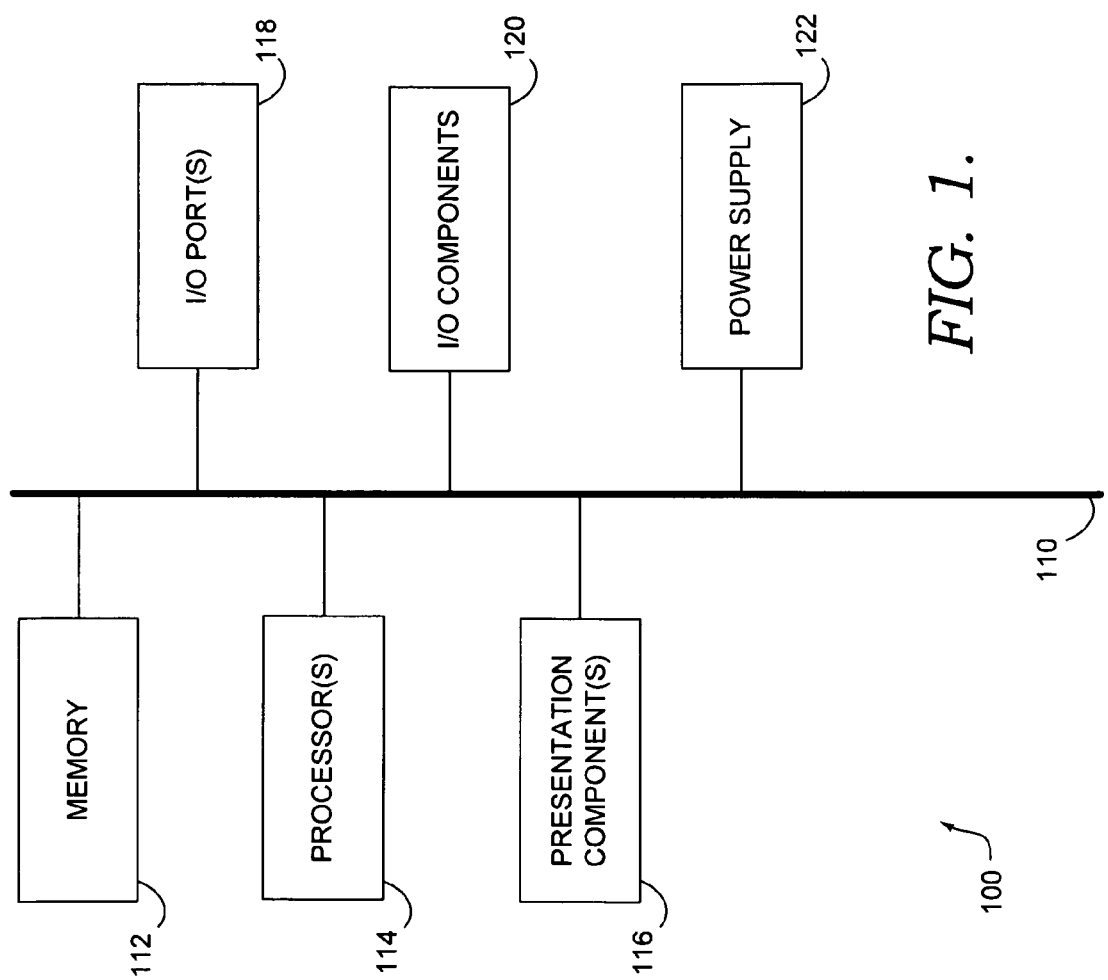
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for associating a known geographic location with a known identity. Feature matching, of at least two images, is performed in at least two iterations that are based on feature vector orientation. A geometric model is applied to the matched points of interest to improve the matched pairs. Two images are identified as being related. As a result, the known geographic location is associated with the known identity.

Accordingly, in one aspect, the present invention provides a method of utilizing a computing device having a processor and computer-readable memory to associate a known geographic location with a known identity. The method includes matching one or more points of interest defined by feature vectors from a first image with one or more points of interest defined by feature vectors from a second image to result in a first set of matched points of interest. Two or more matching iterations are performed. The number of matching iterations is determined based on a predefined range of orientation associated with the feature vectors. The method also includes identifying one or more points of interest that are outliers in the first set of matched points of interest. The method additionally includes removing the outliers from the first set of matched points of interest to result in a second set of matched points of interest. The method additionally includes augmenting each feature vector from the first image that is associated with a point of interest included with the second set of matched points of interest. The augmenting of the feature vector from the first image includes adding a dimensional location associated with a projected location of the point of interest onto the second image. The method also includes augmenting each feature vector from the second image that is associated with a point of interest included with the second set of matched points of interest. The augmenting of the feature vector from the second image includes adding a dimensional location associated with underlying point of interest. The method additionally includes matching one or more points of interest defined by augmented feature vectors from a first image with one or more points of interest defined by augmented feature vectors from a second image to result in a second set of matched points of interest. Two or more matching iterations are performed based on a predefined range of orientations associated with augmented feature vectors. The method also includes calculating a first confidence value based, in part, on the second set of matched points. Further, the method includes determining the first image and the second image are related based on the first confidence value. The method also includes correlating a known identity that is associated with one of the first image or the second image with a known geographic location that is associated with the other of the first image or the second image.

In another aspect, the present invention provides computer storage media having computer-executable instructions embodied thereon for performing a method of associating a known geographic location with a known identity. The method includes determining an orientation of each of a plurality of feature vectors defining points of interest in a first image and a second image. One of the first image or the second image is associated with a known identity and the other of the first image or the second image is associated with a known geographic location. The method also includes identifying feature vectors of the second image with an orientation within a predefined angular range of incrementally changing feature vectors of the first image. The feature vectors of the first image are incrementally changed based on a predefined orientation increment. The method also includes matching at least one point of interest from the first image with at least one point of interest from the second image based, in part, on the feature vectors of the second image identified with feature vectors of the first image to result in a matched points of interest. The method also includes associating the known identity with the known geographic location.

A third aspect of the present invention provides computer storage media having computer-executable instructions embodied thereon for performing a method of associating a known geographic location with a known identity. The method includes receiving a first image and a second image. One of the first image or the second image has a known identity and the other has a known geographic location. The method also includes identifying points of interest. The identification of points of interest includes identifying a first plurality of interest points of the first image and identifying a second plurality of interest points of the second image. The method also includes determining feature vectors associated with each of the points of interest. The determination of feature vectors includes determining a feature vector for each of the first plurality of interest points resulting in a first plurality of feature vectors and determining a feature vector for each of the second plurality of interest points resulting in a second plurality of feature vectors. The method also includes identifying an orientation of the feature vectors. Identifying the orientation of the feature vectors includes identifying a first orientation selection comprised of one or more of the second plurality of feature vectors having an orientation within a predefined angular range of a first selection of the first plurality of interest points and identifying a second orientation selection comprised of one or more of the second plurality of feature vectors having an orientation within the predefined angular range of a second selection of the first plurality of interest points. The method also includes identifying matching points of interest in the first image and the second image. Identifying matching points of interest includes matching one or more of the first selection of the first plurality of interest points with one or more of the first orientation selection and matching one or more of the second selection of the first plurality of interest points with one or more of the second orientation selection. The method also includes applying a homography model to the matched points of interest to identify one or more points of interest that are outliers of the matching points of interest. Additionally, the method includes removing the one or more points of interest that are outliers to result in a first selection of matched points of interest. Further, the method includes augmenting each feature vector associated with the first selection of matched points of interest. A feature vector of a point of interest associated with the first image is augmented with a projected location of the point of interest onto the second image. A feature vector of a point of interest associated with the second image is augmented with a location of the point of interest associated with the second image. The method also includes identifying matching points of interest in the first image and the second image utilizing the augmented feature vectors. The method also includes determining the first image and the second image are related, wherein the first image and the second image are related when a confidence value is above a predefined threshold. The method also includes associating the known identity with the known geographic location.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear and, metaphorically, the lines would more accurately be gray and fuzzy. For example, one may consider a presentation module such as a display device to be an I/O module. In addition, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
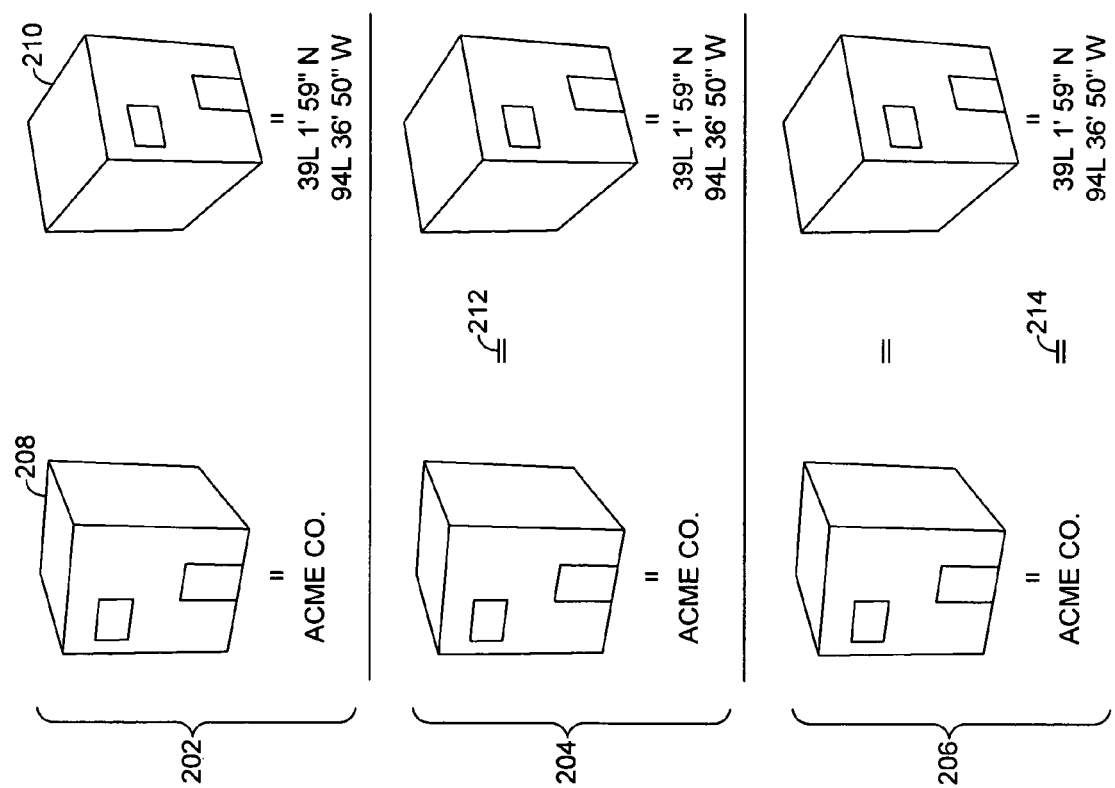
FIG. 2 depicts an exemplary overview of associating a known identity of a first image with a known geographic location of a second image in accordance with embodiments of the present invention.

With reference to FIG. 2, a figure illustrating an exemplary embodiment of the present invention. FIG. 2 illustrates three high-level overview steps that may be employed to associate a known identity with a known location. For example, at a first step 202, a first image 208 is associated with a known identity, such as "Acme Co." A second image 210 is associated with a know location, such as geographic coordinates of 39 degrees, 1 minute, and 59 seconds North and 94 degrees, 36 minutes, and 50 seconds West.

For example, a website operated on behalf of the Acme Company may include an image of a storefront building, such as the first image 208. The website may include other identifying information in addition to the name of the Acme Company, such as a description of products and/or services offered by the Acme Company. Therefore, identity information related to the Acme Company, such as a name, offered products and service, and contact information (e.g., street address, phone number, email) may be associated with an image of the Acme Company. However, the image of the Acme Company from the website may not be associated with a geographic location of known precision and/or accuracy. However, the second image 210, which may be an image of the Acme Company that is provided by a commercial service or other entities, is associated with a geographic location of known precision or accuracy. Therefore, it may be desirable to associate the identity information (e.g., "Acme Company") of the first image 208 with the known geographic location (geographic coordinates) of the second image 210.

At a second step 204, the first image 208 is associated, as indicated at association 212, with the second image 210. The association of the first image 208 with the second image 210 may be accomplished through a variety of methods. In an exemplary embodiment, points of interest are identified on the first image 208 and points of interest are identified on the second image 210. The various points of interest between the two images are matched, and if the matching of points of interest results in a confidence value that exceeds a predefined threshold, the two images may be identified as having captured a common structure, such as the façade of the Acme Company.

At a third step 206, the associated identity (e.g., "Acme Company") of the first image 208 is associated with the geographic location (e.g., "39 degrees, 1 minute, and 59 seconds North and 94 degrees, 36 minutes, and 50 seconds West") of the second image 210. Therefore, an association, as indicated at an association 214, is created that Acme Company is at 39 degrees, 1 minute, and 59 seconds North and 94 degrees, 36 minutes, and 50 seconds West based on a correlation between the first image 208 and the second image 210. As will be discussed in greater detail hereinafter, the ability to accurately geocode businesses, entities, and other structures at a level of resolution that facilitates location-based searching at a human-scale perspective (e.g., street side) avoids errors that typically result from current geocoding techniques that may rely on approximation of location based on a street address or interpolation from multiple points.

The mere use of a street address to identify a location at a human-scale perspective may not provide functional results. For example, when a user performs a location-based search for a business that returns a result with a location on the map, the user may rely on the location identified on the map to find the business. However, if the point on the map is determined based on a street address that has been approximated, the location on the map may merely identify a point within a city block where the business is located without actually identifying the location of the business. For example, if the business is located at the northeast corner of a city block with an entrance to the business located on an east-west alley at the north end of the block, but the address that is relied upon for placing the point on the map indicates a primary north-south street that defines the east side of the city block. Therefore, the map may indicate that the business is somewhere along the north-south street, when in reality, the user needs to locate the entrance that is located at the east-west alley. This is but one exemplary reason that accurate geographic location information (e.g., latitude coordinates and longitudinal coordinates) may be beneficial over a street address or other approximations of location.

The various images that may be used to associate a known identity with a known location may be harvested from a variety of resources. For example, many businesses and entities publish an image of their building or storefront on the Internet. Additionally, one or more vendors provide images of business buildings and storefronts. For example, a vendor may provide images of businesses to a search engine to be returned as part of the search results. In both cases, the image from the Internet and from the vendor may include one or more identifying features, such as a business name, street address, telephone number, or other contact information. However, the images harvested from the Internet or vendors do not typically have an accurate and/or precise geographic location associated therewith. This set of images that have associated identity information, but lack accurate and/or precise geographic location information, are referred to hereinafter as identity images.

Another set of images that are associated with an accurate and/or precise geographic location, but do not have associated identity information, are hereinafter referred to as location images. The location images may be harvested from a variety of sources. For example, a vendor may capture street-side images in conjunction with a Global Positioning System (GPS) provided coordinate for each image. The location images may be captured by a vehicle that transverses a city in a coordinated pattern that allows a plurality of cameras (i.e., four cameras aligned to orthogonal axis) mounted to the vehicle to capture a continuous stream of images at predefined intervals. Each of the images may be encoded with the GPS identified coordinate of where the image was captured. Therefore, the location images may be spatially arranged based on associated geographic locations, but the location images do not generally know an identity of a target captured at the known location.

As a result, in an exemplary embodiment, the first image 208 of FIG. 2 may be an identity image because the "Acme Company" is associated with that particular image and the second image 210 may be a location image because a precise and accurate geographic location is associated with the second image 210. Once the first image 208 and the second image 210 are identified as having the same target (e.g., building, storefront, feature), the identity of the first image 208 may be associated with the geographic location of the second image 210 to result in the identity of the first image 208 having a location of the second image 210.

Figure 3:
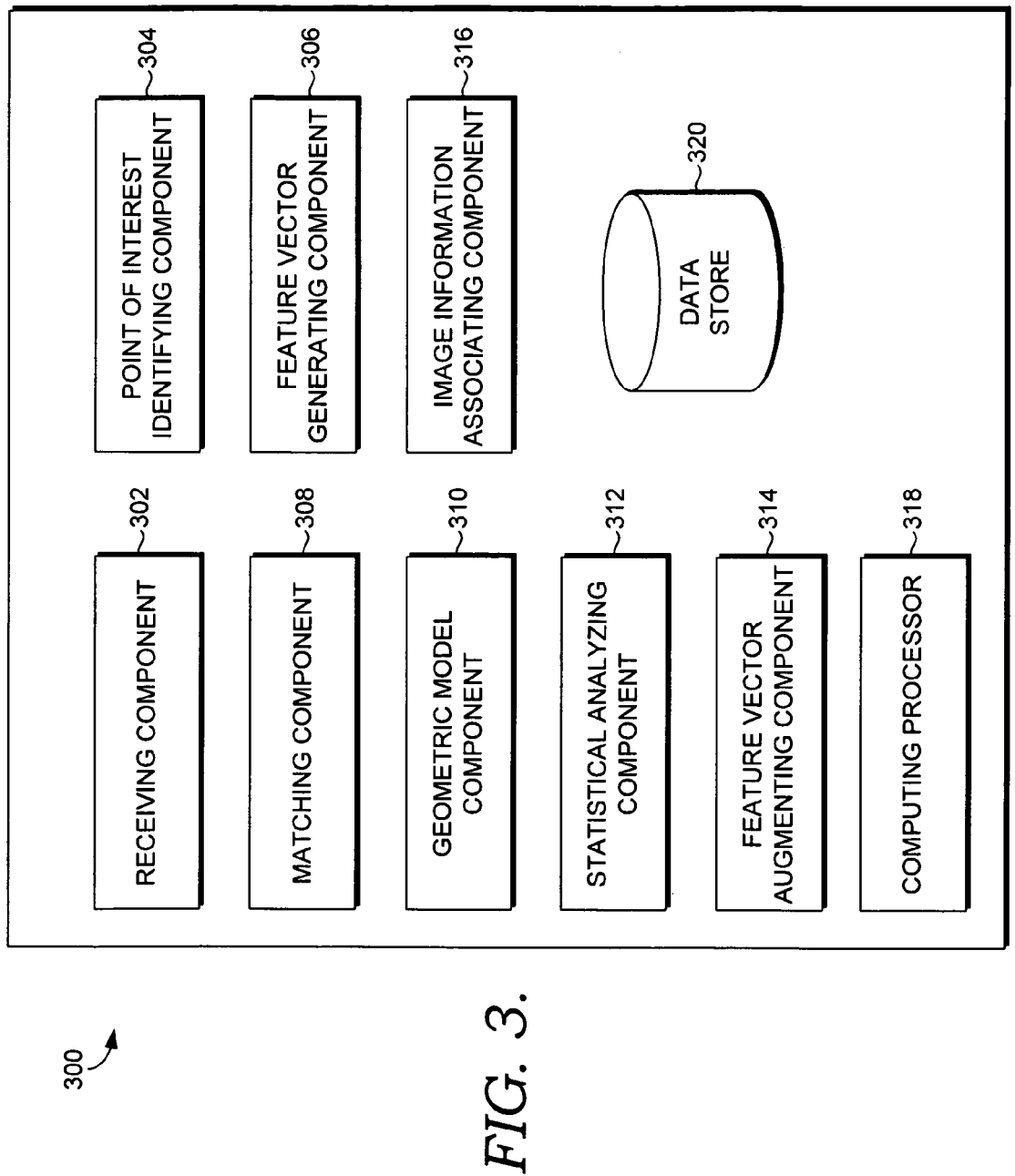
FIG. 3 depicts an environment for associating a known geographic location with a known identity, the environment is suitable for implementing embodiments of the present invention.

Turning to FIG. 3, a block diagram of an exemplary system 300 that is functional to associate a known geographic location with a known identity. The system 300 includes, among other components not shown, a receiving component 302, a point of interest identifying component 304, a feature vector generating component 306, a matching component 308, a geometric model component 310, a statistical analyzing component 312, a feature vector augmenting component 314, an image information associating component 316, a computing processor 318, and a data store 320. It should be understood that this and other arrangements described herein are set forth only as examples. Other arrangements and elements (e.g., components, processors, memory, and networks) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 3 may be any type of computing device and/or coupled to any type of computing device, such as computing device 100 described with reference to FIG. 1, for example. Additionally, the components/elements of FIG. 3 may communicate with each other via a network (not shown) which may include, without limitation, one or more local area networks (LANs) and/or wide area networks (WANs). Such networking environments are commonplace in offices, enterprise-wide computer networks, intranets, and the Internet.

The receiving component 302 is a component that is functional to receive information for utilization by the system 300. For example, the receiving component 302 may receive a first image and a second image in an effort to correlate a known identity of one of the images with a known geographic location of another image. In an exemplary embodiment, the receiving component 302 is functional to receive information by way of a network, such as the Internet. In an additional exemplary embodiment, the receiving component 302 receives one or more commands from a user, computing device, or other entity to begin identifying correlated images and other commands related to achieving a method of associating a known geographic location with a known identity.

The point of interest identifying component 304 is a component functional to identify one or more points of interest in one or more images. A point of interest is located at a pixel or grouping of pixels located within an image that have unique characteristics. In an exemplary embodiment, a point of interest, also referred to as a key point or an interest point, is identifiable utilizing a Scale-Invariant Feature Transform (SIFT). SIFT is functional to identify one or more points of interest within an image that identify one or more features of the image. Various refinements may be employed in some embodiment within SIFT to reduce noise, contrast sensitivity, and edge responses, for example. Points of interest will be discussed in additional detail hereinafter, for example with respect to FIGS. 6 and 7.

In an exemplary embodiment employing SIFT, a point of interest may be identified in the following manner. An image is processed with Gaussian filters at different scales to allow a difference of successive Gaussian-blurred images of the original image to be taken. Points of interest are then taken as maximum and minimum of the Difference of Gaussians (DoG) that occurs at the multiple scales. For example, a DoG image ($D(x, y, \sigma)$) may be defined by $D(x, y, \sigma)=L(x, y, k_i\sigma)-L(x, y, k_j\sigma)$, where $L(x, y, k\sigma)$ is the original image and $I(x, y)$ is processed with a Gaussian blur $G(x, y, k\sigma)$ at a scale of $k\sigma$. Therefore, a DoG image between scales $k_i\sigma$ and $k_j\sigma$ is the difference of the Gaussian-blurred images at scales $k_i\sigma$ and $k_j\sigma$. A point of interest may then be identified as the local maximum/minimum of the DoG image across the scales. To accomplish this, each pixel may be compared in the DoG image to the closest eight neighbors as the same scale and nine corresponding neighbors in each of the neighboring scales. If the pixel value is the maximum or minimum among all compared pixels, that pixel may be identified as a candidate point of interest. A candidate point of interest may be a point of interest for purposes of an embodiment of the present invention, or a candidate point of interest may be just that, a candidate. A candidate point of interest may then be subjected to one or more refinement processes to reject the candidate points of interest that are not reliable for one or more reasons.

The feature vector generating component 306 is a component functional to generate a feature vector defining a point of interest. For example, a point of interest may be identified by the point of interest identifying component 304 in an image and the feature vector generating component 306 may then determine an orientation and/or a magnitude associated with the vector. The identification of one or more feature vectors for a given point of interest aids in achieving invariance to rotation of the image. For example, a point of interest identified in a first image taken of a target object (e.g., building front) from a first perspective and a similar point of interest in a second image taken from a second perspective of the target object have a similar feature vector orientation regardless of the rotation between the first image and the second image. Feature vectors will be discussed in additional detail herein with respect to FIGS. 8-11.

In an exemplary embodiment, a feature vector is generated utilizing a SIFT methodology. For example, to identify an orientation associated with a point of interest, a Gaussian-smoothed image $L(x, y, \sigma)$ at the point of interest's scale $\sigma$ is taken to allow the computations to be performed in a scale-invariant manner. An image sample $L(x, y)$ at a scale $\sigma$ has a gradient magnitude of $m(x, y)$ and an orientation of $\Theta(x, y)$ may be computed using pixel differences. For example, the computations may be performed utilizing:

$$m(x, y) = \sqrt{\begin{array}{c}(L(x+1, y) - (L(x-1, y))^2 + \\ (L(x, y+1) - L(x, y-1))^2\end{array}} \text{ and}$$

$$\Theta(x, y) = \tan^{-1}\left(\frac{L(x, y+1) - L(x, y-1)}{L(x+1, y) - L(x-1, y)}\right).$$

The orientation, which also may be referred to as a direction, and the magnitude calculations for the gradient may be performed for every pixel in a neighboring region around a point of interest in the Gaussian-blurred image L. An orientation histogram may then be formed that includes a plurality of bins (i.e., 36) that cover an angular range (i.e., 10 degrees). Each sample in the neighboring region added to a histogram bin is weighted by its gradient magnitude and by a Gaussian-weighted circular window with a $\sigma$ that is a factor (i.e., 1.5) times that of the scale of the point of interest. The resulting peaks in the histogram correspond to a dominant orientation.

Continuing with this example, the generation of a feature vector may include additional processing to ensure invariance to image location, scale, and rotation (i.e., roll angle). An image at a scale closest to the point of interest's scale is used where the contributing of each pixel is weighted by the gradient magnitude and by a Gaussian with $\sigma$ at a factor (i.e., 1.5) times the scale of the point of interest. Histograms may contain 8 bins each, and each descriptor contains a 4×4 array of 16 histograms around the point of interest. This results in a SIFT feature vector with 128 dimensions (8×4×4=128 dimensions). Further, the resulting vector may be normalized to enhance the invariance to illumination.

Feature vectors with 128 dimensions for a first image having "n" points may be represented as:

$$\{D_1^1, D_2^1, D_3^1 \ldots D_n^1\}$$

$$D_i^1 = \begin{bmatrix} {}_1d_i^1 \\ {}_2d_i^1 \\ {}_3d_i^1 \\ \vdots \\ {}_{128}d_i^1 \end{bmatrix},$$

and feature vectors with 128 dimensions for a second image having "m" points may be represented as:

$$\{D_1^2, D_2^2, D_3^2 \ldots D_m^2\}$$

$$D_j^2 = \begin{bmatrix} {}_1d_j^2 \\ {}_2d_j^2 \\ {}_3d_j^2 \\ \vdots \\ {}_{128}d_j^2 \end{bmatrix}.$$

While the above examples have specifically discussed the utilization of SIFT for point of interest identifying and feature vector generating, it is contemplated additional methodologies may be utilized to achieve a similar result. For example, Gradient Location and Orientation Histogram is but yet another methodology that may be implemented to describe one or more features of an image.

The matching component 308 is a component functional to match one or more points of interest from at least a first image with one or more points of interest from at least a second image. For example, a point of interest defined by a feature vector in a first image may be matched to a similar point of interest defined by a similar feature vector in a second image. The matching of points of interest will be discussed in additional detail with respect to FIGS. 12-14 herein.

In an exemplary embodiment, the matching of interest points, which may also be referred to as feature matching, is performed utilizing a plurality of iterations (i.e., subsets) that correspond to angular ranges of incrementally changing feature vectors. The concept of performing feature matching in incremental steps that match subsets of the points of interest as opposed to matching all points of interest in a single iteration will be discussed in greater detail with respect to FIG. 14. However, in summary, a subset of points of interest from a first image are selected. For example all points of interest defined by feature vectors with an orientation within a pre-defined angular range (i.e., all feature vectors ±2.5 degrees) from an incrementally changing direction (i.e., a series of directions that follow 5, 10, 15, 20 . . . 365 degrees of orientation) are selected to be matched with points of interest in the second image. For example, all points of interest in the second image that have feature vectors within a given range (i.e., ±22.5 degrees) of the first subset are evaluated as being a matching point of interest to points of interest identified in the first subset of points of interest in the first image. The utilization of multiple iterations or subsets in the matching process is a viable option in an exemplary embodiment, because the roll angle between the first image and the second image is limited to a predefined range, such as 30 degrees or less.

The geometric model component 310 is a component for applying a geometric model to the matched points of interest to verify and improve the matched points of interest between the images. For example, a geometric constraint may be applied to the matched points of interest to verify that the matched points actually correspond to a similar feature or location within the images. In an exemplary embodiment, because building facades can be approximated well by a planar model, and the geometric distortion induced on planes by a central projection in a camera can be described by a homography model, a homography methodology may be utilized to remove one or more mismatched points of interest. Homography is an invertible transformation from a projective plane to a projective plane that maps straight lines to straight lines, which is conducive to features that may be approximated well by a planar geometry. It is contemplated that the geometric model component 310 may utilize any geometric model that best fits the features of the images to which the model will be applied. For example, projective transformations in general may be applied to a variety of geometric shapes. The application of a geometric model will be discussed in additional detail herein at FIGS. 16-19.

The statistical analyzing component 312 is a component for analyzing statistical metrics that may be utilized with a method of associating a known identity with a known location. For example, a confidence value that identifies a confidence that a first image and a second image include similar features may be determined to aid in the identification of related images. Additionally, a correlation coefficient of gray value of overlapping regions of two or more images may be determined. Additionally, statistical analysis may be performed on the matched points of interest to identify one or more statistical outlier (or inversely statistical inliers) based, in part on an applied geometric model. Additionally, the statistical analyzing component 312 may be a function to determine a maximum correlation coefficient, a Root Mean Square (RMS) error and/or an average Euclidean distance of points of distance after various processes have been performed. It is understood that the statistical analyzing component 312 is not limited to the functions described herein but instead may be functional to determine and analyze any statistical metric for associating a known identity with a known location.

The feature vector augmenting component 314 is a component function to augment one or more feature vectors with one or more additional or less dimensions. For example, a dimensional location may be added to a feature vector. For example, a feature vector defining a point of interest from a first image that is matched with a point of interest of the second image may be augmented to incorporate an X-axis and Y-axis coordinate of the point of interest from the second image or an X-axis and Y-axis coordinate of the point of interest projected onto the second image utilizing a geometric model. Additionally, the dimensional location may be corrected based on one or more geometric models that are applicable to one of the images or the method of associating a known identity with a known location. For example, a homography model that has been applied to a first image and a second image to identify one or more outliers may also be utilized to normalize an expected location (i.e., projected location) of a point of interest from the first image onto a location in the second image. The expected location, as a result of the homography model, may be expressed in a coordinate position on the first and/or the second image.

Augmented feature vectors that include an X-axis and a Y-axis location of a point of interest for a first image having "n" points may be represented as:

$$\{D_1^1, D_2^1, D_3^1 \ldots D_n^1\}$$

$$D_i^1 = \begin{bmatrix} {}_1d_i^1 \\ {}_2d_i^1 \\ {}_3d_i^1 \\ \vdots \\ {}_{128}d_i^1 \\ f*x_i'^1 \\ f*y_i'^1 \end{bmatrix}$$

and augmented feature vectors with 130 dimensions for a second image having "m" points may be represented as:

$$\{D_1^2, D_2^2, D_3^2 \ldots D_m^2\}$$

$$D_j^1 = \begin{bmatrix} {}_1d_j^2 \\ {}_2d_j^2 \\ {}_3d_j^2 \\ \vdots \\ {}_{128}d_j^2 \\ f*x_j^2 \\ f*y_j^2 \end{bmatrix}$$

where "f" is a weighting factor.

In the above example, the first image is augmented with the X and Y coordinates of a point of interest of the first image as located on the second image, hence the prime designation (i.e., superscript apostrophe). The X and Y coordinates that augment the feature vector associated with the second image represent a coordinate of the point of interest on the second image and therefore are not designated as a prime location. It is contemplated that a point of interest from the second image may also be augmented with a location of that point of interest superimposed on the first image utilizing a geometric model to adjust for variations in the perspective from which the images were captured.

The image information association component 316 is a component functional to associate information from at least one image with information from at least one other image. For example, a first image includes information related to a business's identity (e.g., business name and contact information) while a second image includes information of a precise location of a target feature of the image (e.g., latitude and longitude of a front door of the business). The image information associating component 316 is functional to associate the identity information with the geographic information in this example. In an exemplary embodiment, a data store, such as the data store 320 is functional to maintain the association of the information. For example, a data structure, such as a database that is accessible by a search engine may be incorporated within the data store 320, wherein the data structure is functional to maintain the association between an identity and a geographic location for providing results in a location-based search query entered by a user.

In an exemplary embodiment, the image information associating component 316 associates information of one image with information of another image when both images have been determined to be related to one another. A first image and a second image may be determined to be related when a target feature (i.e., a building front) of both images has been identified as representing the same or similar target feature. The identification may be a result of a confidence value exceeding a predefined threshold, where the confidence value is a function that may be proportional to the number of inliers (NI) minus a minimum predefined number of inliers (MI). The confidence level may also be proportional to a maximum correlation coefficient between either a first correlation of gray value or a second correlation of gray values as discussed in FIGS. 20 and 21. The confidence may also be inversely proportional to a log base 10 RMS reprojection error of projecting one image onto a second image and comparing the projected location of a point of interest from the first image with the corresponding matched point of interest from the second image. Additionally, the confidence level may additionally be inversely proportional to an average Euclidean distance of a feature vector after matching and RANSAC filtering. Therefore, in an exemplary embodiment, a confidence value may be $$calculated\ as\ ConfidenceValue = \frac{(NI-MI)*MaximummCorrelationCoefficient}{\log_{10}(RMSError+1)*AverageEuclideaDistance}.$$

The above referenced confidence value is but one exemplary confidence value and is not limiting as to the scope of the present invention.

Another exemplary embodiment of the present invention includes one or more additional metrics to calculate a confidence value. For example, a standard deviation of points of interest that are inliers of a first image ("StdDev1") may be incorporated into the confidence value. The standard deviation, in this example, may increase when the points of interest are spread across a larger portion of the image, as opposed to being confined to a small portion of the image. Another metric that may be used to determine a confidence value includes a standard deviation of inliers points in a second image ("StdDev2"). Similar to the discussion above regarding a standard deviation for points of interest in a first image, the standard deviation in a second image may increase when the points are spread across a greater portion of the second image.

In yet another exemplary embodiment, an additional property that may be used to calculate a confidence value includes an evaluation to determine if a geometric model is valid for the images. This may be accomplished in an embodiment by identifying a vector in a first image with a general orientation upward (e.g., 0 degree orientation), wherein the identified vector is generally located along the bottom border near the center of the image. The identified vector is confirmed to maintain the general upward vertical orientation in the second image after having the geometric model applied. A presumption exists that if two images are captured from a similar roll angle, an upward looking vector should appear upward looking in a second image. As a result, it is possible to use the deviation of the projected upward vector to evaluate the geometric model. For example, this could be accomplished by computing a cosine squared of the project upward vector ($\alpha$) in the second image. However, it is understood that in an exemplary embodiment, only some of the discussed metrics are utilized to calculate a confidence value. But, in an exemplary embodiment, a formula for calculating the Confidence Value (CV):

$$CV = \frac{(NI-MI)*MaximummCorrelationCoefficient*\cos^2(\alpha)}{\log_{10}(RMSError+1)*\log_{10}(StdDev1)*\log_{10}(StdDev2)*AverageEuclideaDistance}$$

It is contemplated that a confidence value is not limited to a static formula, such as those discussed above, which is then compared to a threshold to identify a correct or incorrect image match. Therefore, in an exemplary embodiment, one or more of the previously discussed metrics as well as additional statistical measures may be used with a feature classifier to determine if an image match is correct. For example, a Maximum Likelihood classifier, a k-Nearest Neighbor classifier, a neural network, etc. may all be implemented individually or in concert to identify a correct image match.

The data store 320 is functional to store data. For example, the data store may store one or more data bases for maintaining associations of information and data. Additionally, the data store 320 may additionally maintain data of a plurality of images, such as a first image with associated information and a second image with associated geographic information. It is contemplated that the data store 320 is in reality a plurality of computer-readable storage media coupled to one or more processors that allow for writing, reading, accessing, sorting, filtering, and storing of data.

Accordingly, any number of components may be employed to achieve the desired functionality within the scope of embodiments of the present invention. Although the various components of FIG. 3 are shown with lines for the sake of clarity, in reality, delineating various components is not so clear, and metaphorically, the lines would more accurately be gray or fuzzy. Further, although some components of FIG. 3 are depicted as single blocks, the depictions are exemplary in nature and in number and are not to be construed as limiting.

Turning to FIG. 4 that depicts a first image 400 taken from a first perspective at a first time and date of a business 402. The image 400 is associated with a known identity. For example, image 400 is known to depict business 402. The association between the business 402 and the image 400 may be a result of metadata associated with the image 400 that describes the association between the image 400 and the business 402. The association may also be a result of data mining or other operations in which the association is drawn between the business 402 and the image 400 based on the context surrounding the image or from where the image is harvested or retrieved. In an exemplary embodiment, the image 400 is an image harvested from an Internet site associated with the business 402, such as www.business402website.com. In an additional exemplary embodiment, the image 400 is harvested from a vendor that provides images of businesses or other entities, typically for a fee. In either case, the image 400 includes or is associated with an identity of the business 402. It is understood that the term identity as previously discussed, is not limited to a business name, but instead is any characteristic that defines an entity or feature. Examples include, but are not limited to, a name, services offered, hours of operation, contact information, and the like.

The image 400 is captured from a first perspective. The first perspective captures different features and objects that may not be captured from a different perspective. Additionally, the image 400 is captured at a particular season, a particular environment conditions (e.g., clouds, weather), and time of day, all of which may change shadows, luminance, foliage, and other potentially obscuring features or elements. Therefore, a method for associating the known identity of the image 400 with a known location of a second image that is invariant to such potential distractions is desirable.

Turning to FIG. 5 that depicts a second image 500 taken from a second perspective at a second time and date of a business 502. The image 500 is similar to the image 400 of FIG. 4, but taken from a different perspective. For example, image 500 is taken from an apparently higher and more straight-on perspective than image 400 of FIG. 4. Additionally, various other elements and features are different between image 400 and image 500. For example, lighting, shadows, vehicles, foliage all may be varied because of the conditions when each image was captured. However, both image 500 and image 400 depict the same building and the same business 402 and business 502.

The image 500 is an image associated with a known geographic location of acceptable precision and/or accuracy. As previously discussed, the mere knowledge of a street address is not sufficient for purposes of an exemplary embodiment of the present invention. For example, an address for purposes of location-based searching may be merely interpolated across a city block in which it is logically expected to be located. However, this interpolation of a street address may result in the identified location being meters or yards off from an accurate location of the feature. Errors such as those created by interpolating a location based on a street address can be distracting. For example, in location-based searching, a location that is presented from a human-scale perspective (e.g., street-side image) may not include the desired result because the limited field of view offered by a street-side perspective image (e.g., only several meters of features are presented at a time based on the scale associated with this type of result). Therefore, a user would be presented an image that includes the wrong business or building than was expected to be returned. A level of sufficient accuracy and/or precision may be obtained by a GPS unit that is typically utilized to geocode images. For example, a vendor may outfit a vehicle with a plurality of cameras that capture images at predefined intervals. The vehicle may also contain a GPS unit that records a geographic location associated with each captured image. The geographic location may then be associated through geocoding (i.e., process of attaching metadata that describes a geographic location) with the image.

As used herein, a first original image may be represented by image 400 of FIG. 4 and a second original image may be represented by image 500 of FIG. 5. However, it is understood that this is merely for explanation purposes and not limiting as to the scope of the present invention. For example, the first image may have a geographic location associated with it, and a second image may have an identity associated with it. Additionally, the business 502 (or business 402 of FIG. 4) is not intended to be limiting as to the scope of the present invention. Instead, any feature, building, element, or the like that is applicable to a similar methodology as described herein may be utilized.

Figure 6:
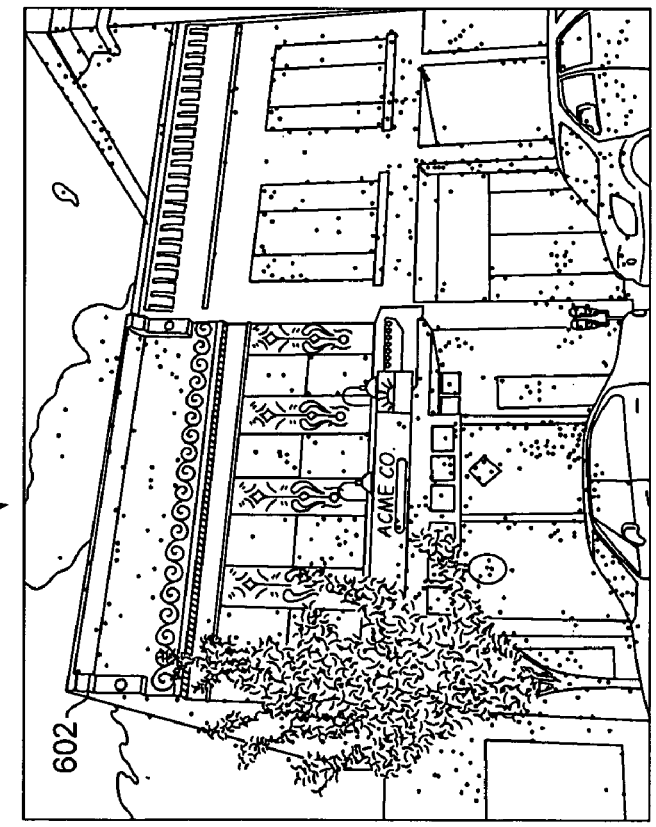
FIG. 6 depicts an exemplary first image with identified points of interest, the first image is in accordance with an embodiment of the present invention.

Turning to FIG. 6 that depicts an image 600. The image 600 includes a plurality of points of interest that have been identified, such as point of interest 602. Image 600 is similar to the image 400 of FIG. 4; however, image 600 has been altered to visually depict a plurality of points of interest that have been identified. As previously discussed, a point of interest is a space in an image that has unique characteristics. For example, a SIFT process may be applied to an image to mathematically identify a plurality of points within the image that are points of interest.

Figure 7:
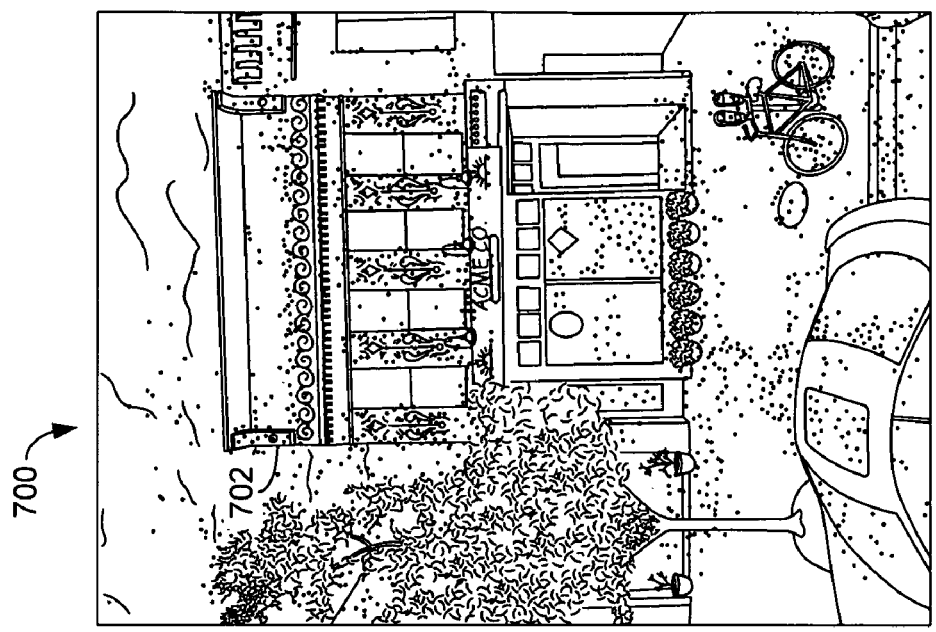
FIG. 7 depicts an exemplary second image with identified points of interest, the second image is in accordance with an embodiment of the present invention.

Turning to FIG. 7 that depicts an image 700. The image 700 includes a plurality of points of interest, such as a point of interest 702. Image 700 is similar to the image 500 of FIG. 5; however, image 700 has been altered to visually depict a plurality of points of interest that have been identified.

Figure 8:
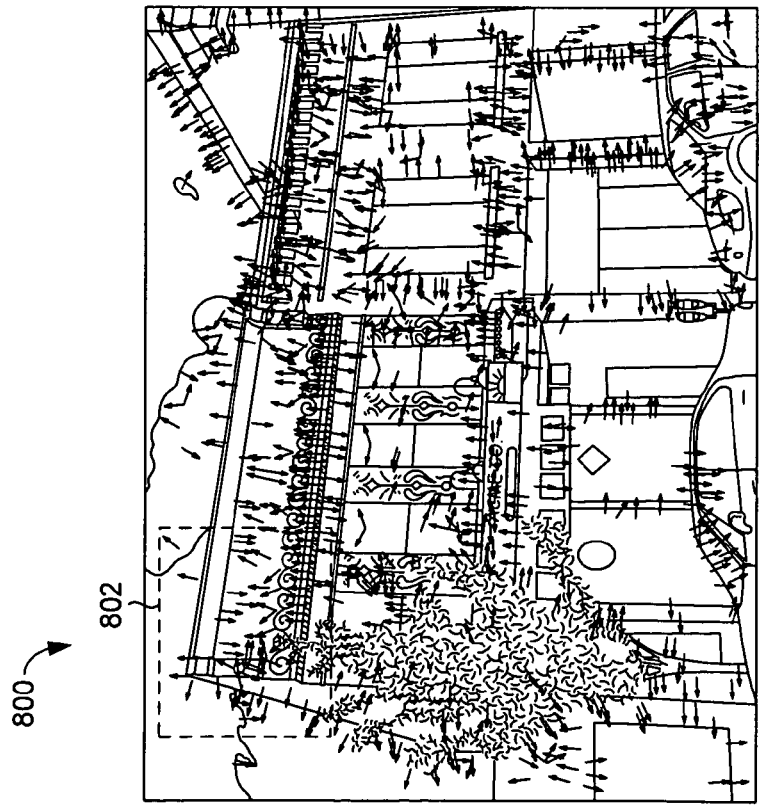
FIG. 8 depicts an exemplary first image with feature vectors defining the points of interest, the first image is in accordance with an embodiment of the present invention.

Turning to FIG. 8 that depicts an image 800. The image 800 visually depicts a plurality of feature vectors. In an exemplary embodiment, a feature vector is generated for each point of interest of the image. For example, the points of interest of image 600 of FIG. 6, may now have an associated feature vector to define the point of interest based on an orientation and/or a magnitude. In an additional exemplary embodiment, two or more feature vectors may be generated for a particular point of interest, but in such a case, an additional point of interest may be generated at the same location so that each feature vector is associated with a unique point of interest.

In an exemplary embodiment, the feature vector is a 128 dimensional SIFT feature vector that is generated utilizing a SIFT process as discussed above. Traditionally, the feature vector will indicate an orientation, which is related to a gradient direction at the point of interest. For example, a feature vector may have an orientation that is aligned to a gradient that represents the greatest transition from dark to light surrounding the point of interest.

Figure 10:
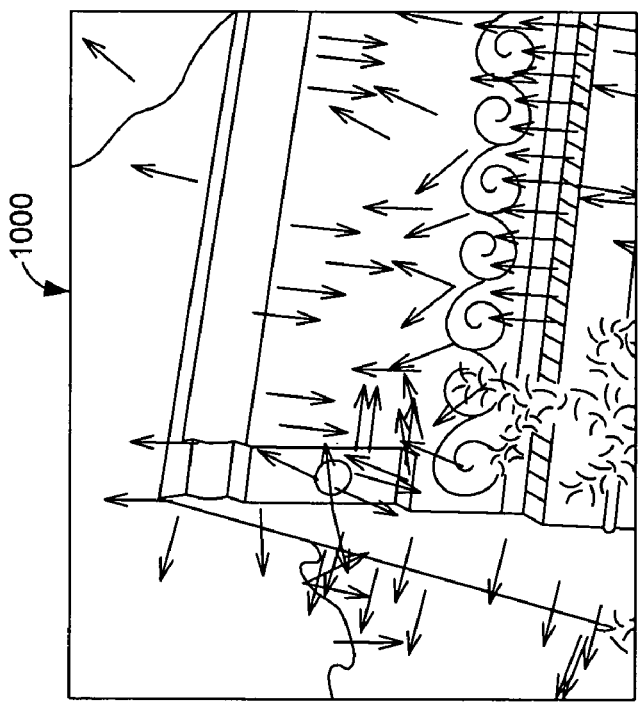
FIG. 10 depicts an exemplary zoomed first image with feature vectors defining the points of interest, the first image is in accordance with an embodiment of the present invention.

An area 802 is a portion of the image 800 that is depicted at a greater scale in FIG. 10. FIG. 10 depicts an exemplary image 1000 that is a portion of the image 800 of FIG. 8. Image 1000 provides a detailed view of a selection of feature vectors that indicate an orientation that may coincide with a gradient from dark to light at the point of interest.

Figure 9:
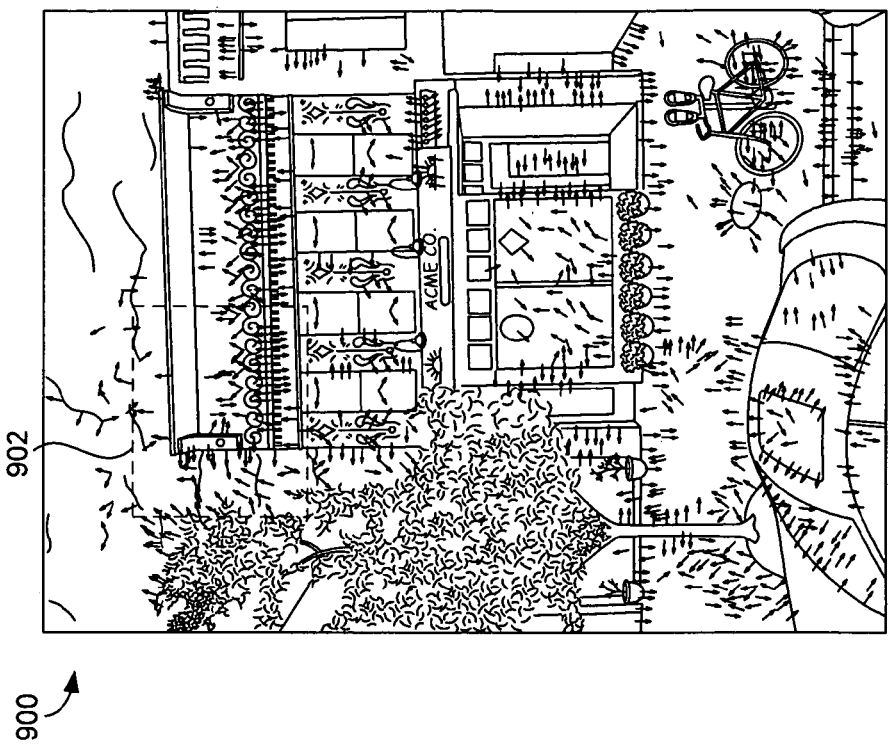
FIG. 9 depicts an exemplary second image with feature vectors defining points of interest, the second image is in accordance with an embodiment of the present invention.
Figure 11:
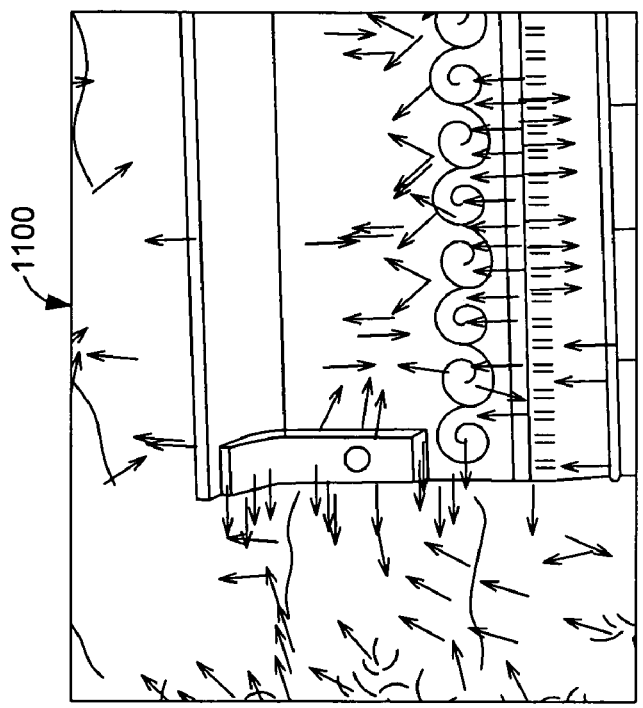
FIG. 11 depicts an exemplary zoomed second image with feature vectors defining points of interest, the second image is in accordance with an embodiment of the present invention.

Turning to FIG. 9 that depicts an image 900. The image 900 visually depicts a plurality of feature vectors. In an exemplary embodiment, the feature vectors of the image 900 define each of the points of interest depicted at image 700 of FIG. 7. The image 902 includes an area 902 that is a portion of the image 900 that is depicted at a greater scale in FIG. 11. FIG. 11 depicts an exemplary image 1100 that is a portion of the image 900 of FIG. 9. Image 110 provides a detailed view of a selection of feature vectors that indicate an orientation that may coincide with a gradient from dark to light at the point of interest.

Feature vectors that are scale invariant and rotation invariant may be used to find similar points of interest in multiple images regardless of scale and rotation. For example, the points of interest depicted in FIG. 6 may be matched with points of interest depicted in FIG. 7 based on the feature vectors of FIG. 8 and FIG. 9, respectively.

In an exemplary embodiment, feature matching is employed to identify points of interest from a first image that match with points of interest from a second image. For example, several hundred points of interest from the image 600 of FIG. 6 may be matched with several hundred points of interest from the image 700 of FIG. 7. In an exemplary embodiment, the matching of points of interest (i.e., feature matching) is performed in a series of iterations as opposed to all at once as is traditionally performed. This is possible because the images to be compared for matching purposes are limited to a predefined roll angle difference. A roll angle is an angle difference between the perspectives at which each image is captured. For example, the roll angle may be limited to images that have less than a 30-degree roll angle, a 20-degree roll angle, or a 15-degree roll angle. As a result, multiple subsets of points of interest may be matched at various iterations.

Figure 12:
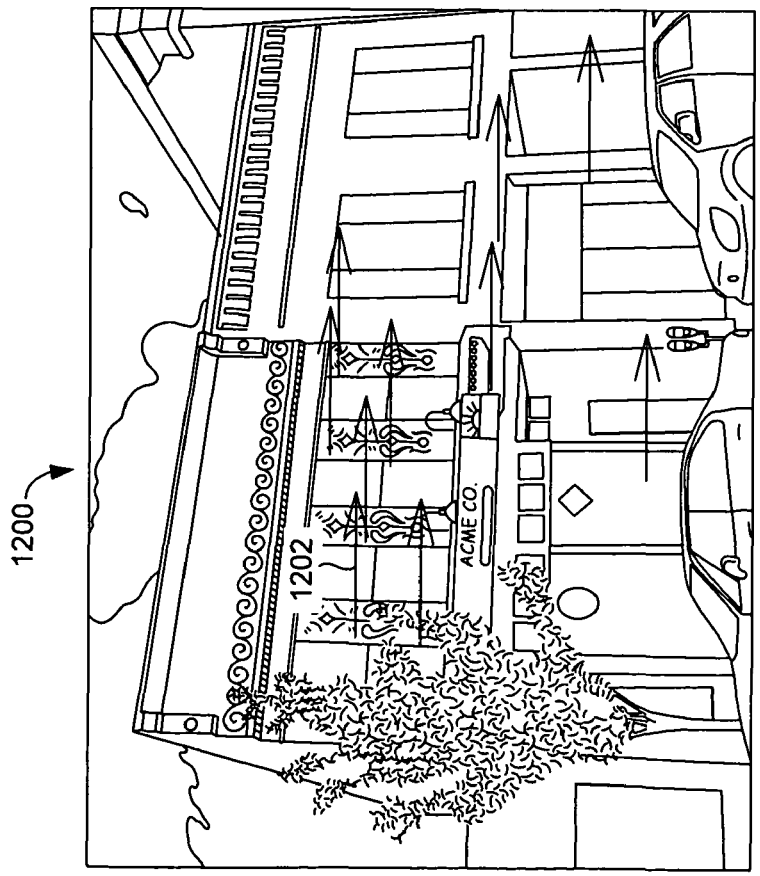
FIG. 12 depicts an exemplary first image with feature vectors at a first orientation increment, the first image is in accordance with an embodiment of the present invention.

For example, turning to FIG. 12 that depicts an image 1200. The image 1200 includes feature vectors within a predefined range of orientation. For example, a feature vector 1202 is a feature vector within the predefined range of a primary orientation. In this example, the predefined range of orientation is a range defined by feature vectors with a 90-degree orientation (i.e., primary orientation) with a tolerance defined by the number of bins and the angular range associated with the bins. As previously discussed, a histogram that has 36 bins with each bin covering 10 degrees may therefore result in all vectors with an orientation within a 10-degree range of 90 degrees in the provided example. However, it is understood that the angular range may also be independent of the underlying methodology utilized to determine the orientation of a feature vector. For example, the predefined range of orientation may be a nonoverlapping value that coincides with the number of orientation iterations that will be performed, such as 73 iterations that include an angular range of 5 degrees (e.g., 5*73=365). Because the matching is performed in at least two iterations (e.g., the matching of points of interest are divide into logical subsets based on orientation to prevent having to match all points in a single iteration) in an exemplary embodiment, it is possible to achieve matched pairs with fewer outliers and a greater number of matched points of interest result than if the process was performed in a single iteration.

Figure 13:
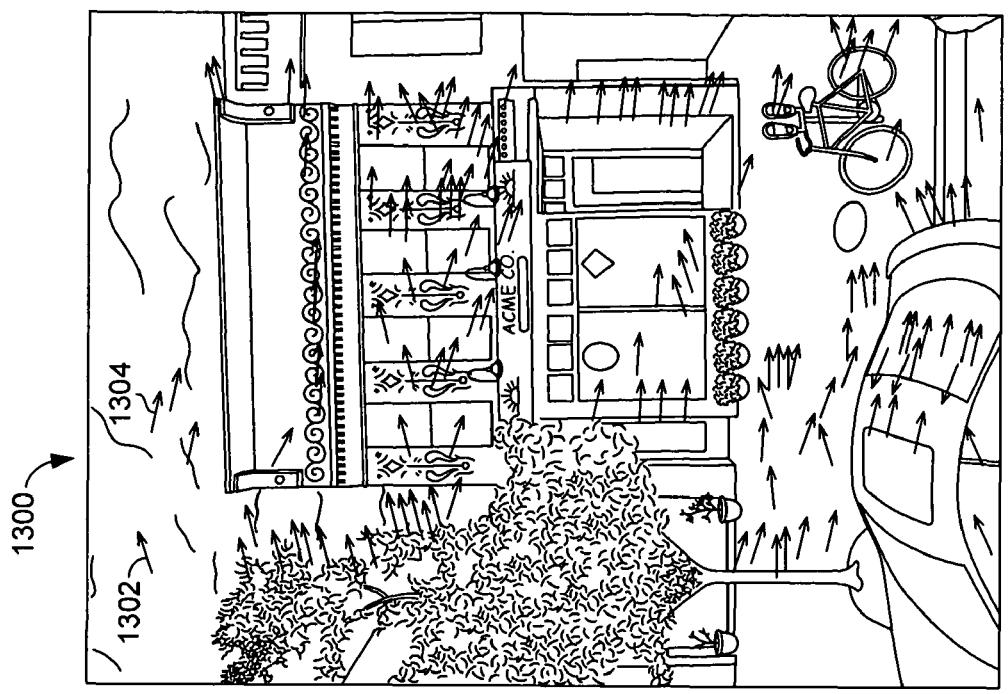
FIG. 13 depicts an exemplary second image with feature vectors within a predefined angular range of a first predefined orientation increment, the second image is in accordance with an embodiment of the present invention.

Turning to FIG. 13 that depicts an image 1300. The image 1300 visually depicts the feature vectors of image 1100 of FIG. 11 that are within a predefined angular range. For example, a predefined angular range may include all feature vectors that have an orientation within 22.5 degrees (i.e., a 45-degree spectrum centered over a primary orientation) of a primary orientation. As a result, a feature vector 1302 and a feature vector 1304 are depicted; however, neither feature vector 1302 or the feature vector 1304 coincide exactly with the primary orientation of 90 degrees depicted in FIG. 12, but they are both within the predefined angular range. It is contemplated that the angular range is not limited to 22.5 degrees, but instead may include any range.

Figure 14:
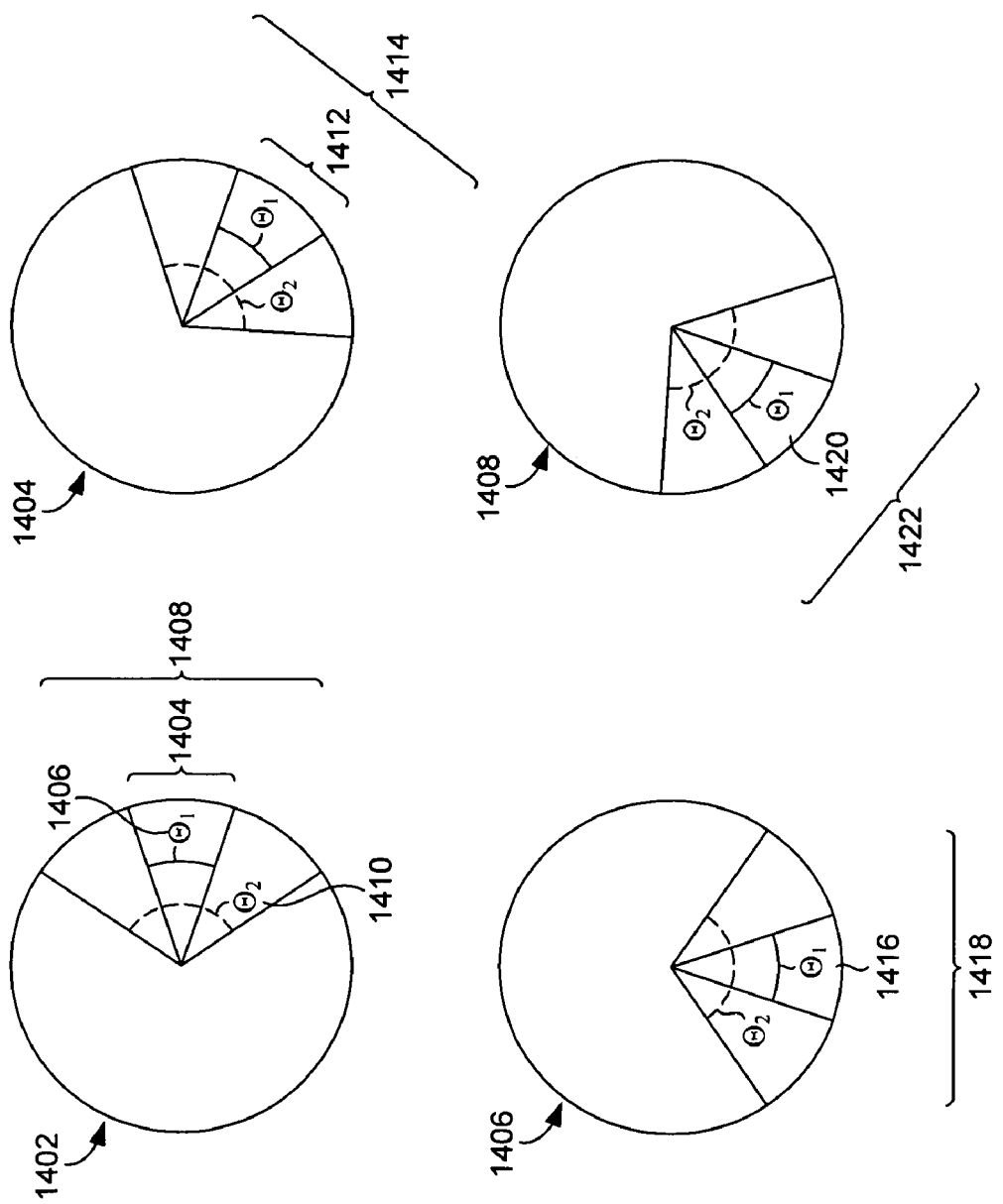
FIG. 14 depicts a plurality of matching iterations, in accordance with an embodiment of the present invention.

The concept of performing a plurality of matching iterations is visually depicted in FIG. 14 that depicts 4 iterations. A first depiction 1402 depicts a predefined orientation range 1404 defined by an angle $\Theta_1$ 1406. The first predefined orientation 1404 is an example of a non-overlapping range of feature vectors that may be selected in a first image, such as the feature vector 1202 of FIG. 12. The first predefined orientation 1404 includes the primary orientation (e.g., 90 degrees) as well as a range surrounding the primary orientation (i.e., $\Theta_1$ 1406). The first depiction 1402 additionally depicts a first predefined angular range 1408 defined by an angle $\Theta_2$ 1410. In an exemplary embodiment, the first predefined angular range 1408 is a range of feature vectors in a second image, such as feature vectors 1402 and 1404 of FIG. 14. The angle $\Theta_2$ 1410 is an angular range, such as 45 degrees as previously discussed with respect to FIG. 14. Therefore, in an exemplary embodiment, the first predefined orientation 1404 includes the feature vectors of a first image that will be matched to feature vectors of a second image, wherein the feature vectors of the second image have an orientation within the first predefined angular range 1408.

A second depiction 1404 represents a second iteration in a feature-matching process. A second predefined orientation 1412 is depicted. The second predefined iteration maintains the $\Theta_1$, but has a new primary orientation from which it is based. A second predefined angular range 1414 also maintains the angle $\Theta_2$, but it too is based on the new primary orientation. Similarly, a third depiction 1406 depicts a third iteration that includes a third predefined orientation 1416 and a third predefined angular range 1418. Further, a fourth depiction 1408 depicts a fourth iteration that includes a fourth predefined orientation 1420 and a fourth predefined angular range 1422. It should be understood that the depictions of FIG. 14 are merely illustrative and are not limiting as to the scope of the present invention.

Figure 15:
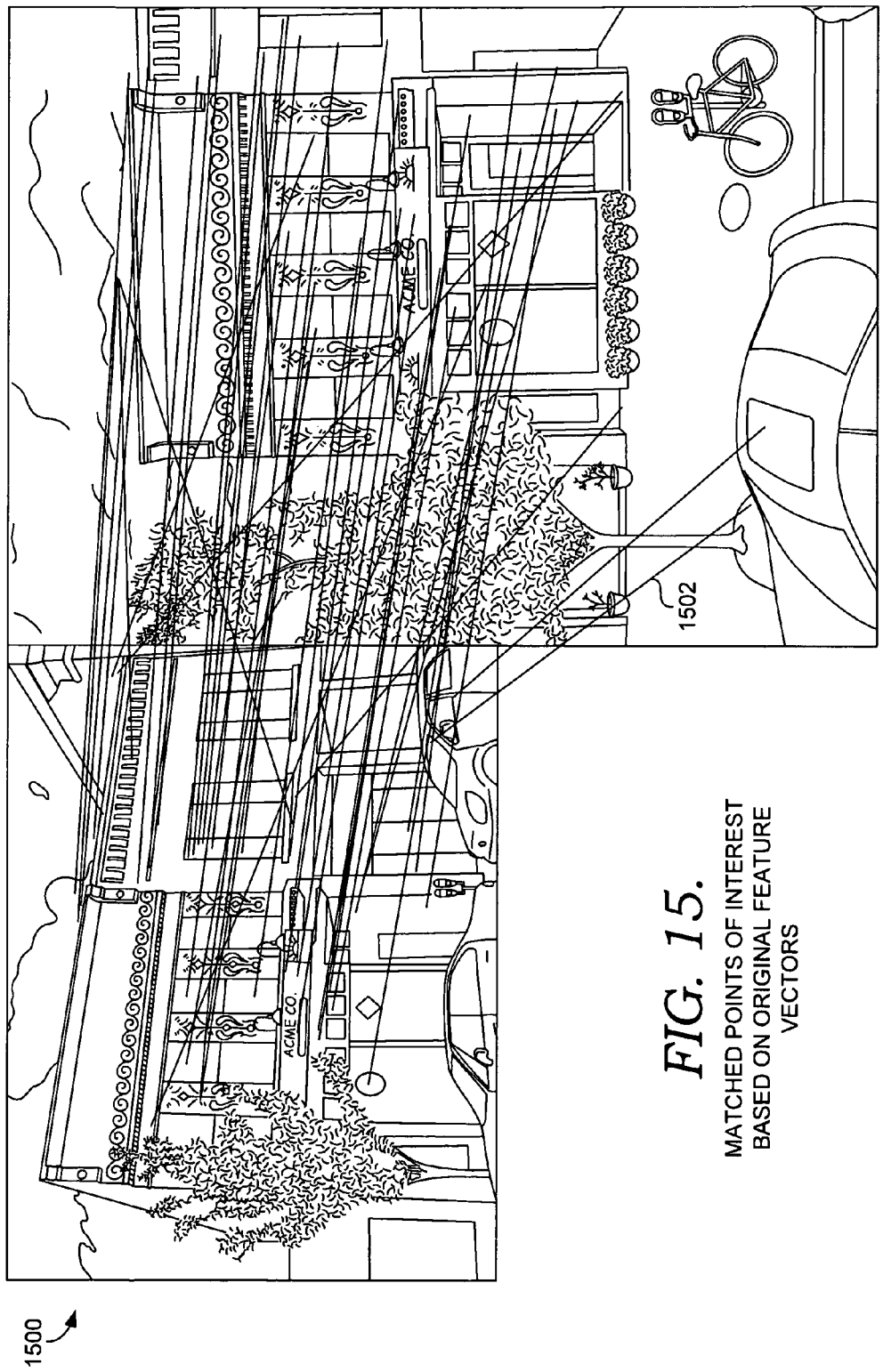
FIG. 15 depicts an image illustrating matched points of interest based on original feature vectors, the image is in accordance with an embodiment of the present invention.

Turning to FIG. 15 that depicts an image 1500. The image 1500 is a compiled image that includes both a first image and a second image as well as a visual depiction of a plurality of matched points of interest. For example, the image 400 of FIG. 4 and the image 500 of FIG. 5 are compiled to form the image 1500. The image 1500 is merely a graphical illustration of a plurality of points that have been identified as being matching points of interest among the first and second images. Therefore, the generation of the image 1500 (as well as all images of FIGS. 4-20) is not necessary in an embodiment of the present invention, but aids in the discussion of the present invention.

The image 1500 includes a plurality of lines, such as a line 1502, that connect a point of interest from the first image to a point of interest in the second image (i.e., matched pairs). The matching of points of interest based on a first matching process, as illustrated at image 1500, includes a number of incorrectly matched points of interest, or otherwise called mismatched points of interest. For example, the line 1502 connects a point of interest in the first image with a point of interest in the second image where the two connected points of interest are different features of the common area.

A verification of the matched pairs may be performed in an exemplary embodiment to identify those matched pairs that are mismatched. In an exemplary embodiment a geometric model is fit to the matched pairs in an attempt to identify one or more outliers. An outlier is a matched pair that is identified as being a mismatched pair of points of interest. In an exemplary embodiment, an outlier is identified through the application of a geometric model that is fit to the matched pairs and one or more matched pairs that do not fit to the geometric model may be identified as being an outlier. Inversely, an inlier, in an exemplary embodiment, is a matched pair that fits to an applied geometric model. For example, a geometric model, such as homography may be applied (i.e., mathematically verified) to the matched pairs. The matched pairs that can be described or conform to the geometric model may be considered as inliers, and those matched pairs that do no conform or cannot be described by the geometric model are outliers.

As previously discussed, homography describes a geometric transformation that happens when a plane is viewed from various angles. Therefore, homography is beneficial when attempting to apply a geometric model to images of buildings because buildings are typically comprised of planar surfaces. However, as previously discussed, if the targets of images are of a different general geometric structure (e.g., cylindrical) then a geometric model more directed to geometric modeling could be implemented. In an additional exemplary embodiment, depth of one or more features captured in an image may be used when identifying a geometric model.

In an exemplary embodiment, a geometric model is selected utilizing Random Sample Consensus (RANSAC) to estimate parameters of the geometric model from a set of observed data that contains outliers. RANSAC is a nondeterministic algorithm as it produces a reasonable result only with a certain probability that increases as more iterations are performed. RANSAC operates on a basic assumption that the matched points consist of inliers, which as previously discussed, may include matched pairs that can be explained by the geometric model parameters. Additionally, RANSAC is based on an assumption that the matched pairs include outliers, which as previously discussed are matched pairs that do not fit the geometric model. RANSAC operates by selecting random points (i.e., hypothetical inliers) of interest from the matched pairs to determine a geometric model that describes the selected points. Remaining points of interest that fit to the model are then considered to be inliers for that geometric model. This process continues for a number of iterations. The geometric model that is determined to have the greatest number of inliers may then be identified as a geometric model that fits the matched pairs. It is understood that the present invention is not limited to the utilization of RANSAC for identifying a geometric model that fits the matched pairs. For example, as opposed to utilizing a RANSAC algorithm, all or a predefined number of matched pairs may be evaluated to brute force determine a geometric model that fits the matched pairs. Once a geometric model has been identified as a model that fits the matched pairs, the geometric model may then be utilized for additional purposes described hereinafter.

In an additional exemplary embodiment an affine transformation is applied to the matched points in addition to, or as an alternative to homography. For example, it may be desirable to determine how far the homography deviates from an affine transformation. If switching to an affine transformation, instead of utilizing the homography model, results in an acceptable (i.e., below a predefined threshold) reprojection error relative to the homography model, the homography is therefore likely to be under defined. As a result, it may be desirable to switch from the homography model to an affine transformation for later feature-matching iteration. However, if affine transformation produces significant (i.e., above a predefined threshold) reprojection errors when applied to the inliers of a homography model, then the homography is likely to be incorrect. If the homography is incorrect, in an exemplary embodiment, the match of images associated with the homography model may be discarded. Additionally, it is contemplated that an affine transformation may be used in place of a homography model as discussed herein. It is understood that the present invention is not limited to geometric models discussed herein, but instead may include additional geometric models. For example, a geometric model (e.g., similarity transform) with a smaller degree of freedom than another geometric model (e.g., homography) may be implemented to prune out under-defined or ill-posed geometric models.

Figure 16:
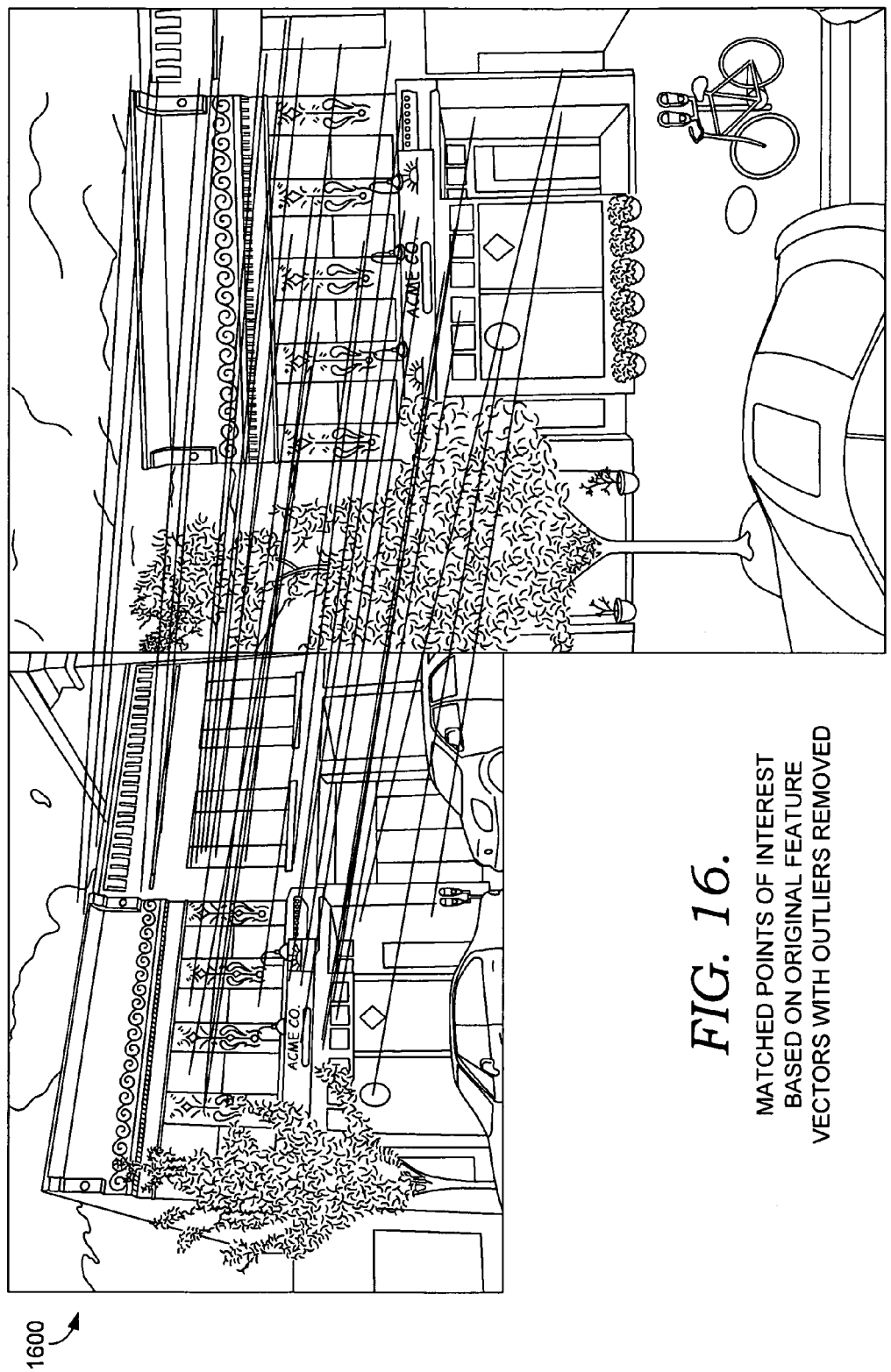
FIG. 16 depicts an image illustrating matched points of interest with outliers removed, the image is in accordance with an embodiment of the present invention.

Turning to FIG. 16 that depicts an image 1600. The image 1600 visually depicts matched pairs similar to those of image 1500 of FIG. 15; however, one or more outliers have been removed from the matched pairs. For example, a homography model identified utilizing RANSAC determined a number of matched pairs that were outliers. As a result, the outliers have been removed as visually depicted in the image 1600.

In an exemplary embodiment, a second iteration of feature matching is performed, wherein this additional feature-matching iteration takes into account the geometric model previously relied upon to identify outliers. For example, the second feature-matching iteration may include information gained from the geometric model, such as coordinate locations. In an exemplary embodiment, the points of interest of a first image may be projected onto a second image based on the geometric model previously utilized. Correctly matched pairs should be within a reasonable proximity of one another once they have been projected onto the corresponding image after being adjusted with the geometric model. Therefore, this proximity is useful when performing the second iteration of feature matching.

The feature vectors of the remaining matched pairs (inliers from the first iteration of feature matching) are augmented to include a coordinate location that has been determined utilizing the geometric model from the first feature-matching iteration. In an exemplary embodiment, feature vectors of a first image are augmented to include an X and Y location of the associated point of interest when projected onto the second image (i.e., coordinate location adjusted based on the geometric model). Additionally, in this exemplary embodiment, a feature vector of a second image is augmented to include a coordinate of the associated point of interest in the second image. As a result, in this example, the points of interest have been normalized in a sense that the points of interest from two images include coordinates within a common area (i.e., the second image). The previous example augmented the feature vectors with coordinates relative to the second image; however, it is understood that this is merely an example and not intended to be limiting as to the scope of the present invention. For example, the feature vectors could alternatively be augmented with the coordinates from the first image. Further, the feature vectors could be augmented with any other additional dimensional information to refine an additional iteration of feature matching.

The resulting feature vectors for each point of interest are referred to as augmented feature vectors. The augmented feature vectors, as previously discussed with respect to FIG. 3, may include any number of dimensions. In an exemplary embodiment, the augmented feature vectors are augmented to add an additional two dimensions, an X and Y coordinate location. As previously discussed, the coordinate locations may be adjusted utilizing a geometric model previously identified in a first iteration.

A second feature-matching iteration may be performed in a manner similar to that previously described. For example, a predefined orientation of feature vectors from a first image are selected and feature vectors in a predefined angular range from a second image are identified as being potential matched pairs. The process continues through a number of iterations of changing predefined orientation of feature vectors from the first image until a set of matched points of interest have been identified. In an exemplary embodiment, a RANSAC algorithm is applied to the matched pairs (i.e., points of interest with augmented feature vectors) to identify one or more outliers that may be removed from the current set of matched pairs.

Figure 17:
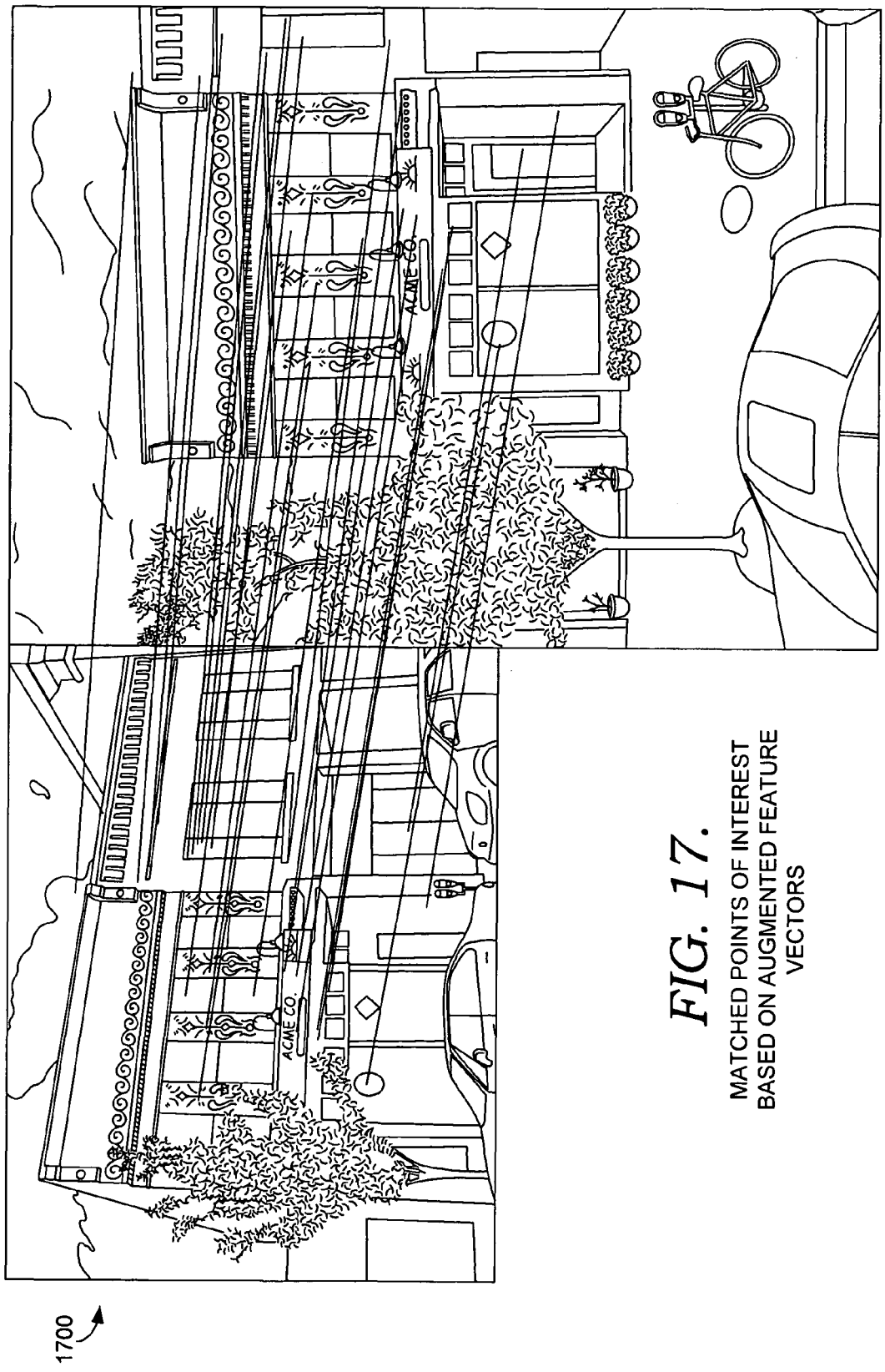
FIG. 17 depicts an image illustrating matched points of interest based on augmented feature vectors, the image is in accordance with an embodiment of the present invention.

Turning to FIG. 17 that depicts an image 1700. The image 1700 visually depicts a number of matched pairs that have resulted from a second iteration of feature matching. The second iteration of feature matching in this example augmented the feature vectors of the points of interest and then applied a RANSAC algorithm to remove mismatched points of interest. As a result, the matched pairs depicted in FIG. 17 are the remaining matched pairs after removal of identified outliers. FIG. 17 is merely a visual depiction of an intended result; however, for clarity purposes the number of matched points of interest are not truly reflected in FIG. 17. For example, in a precise depiction of matched points of interest after a second matching iteration based on the augmented feature vectors, there are typically fewer miss-matched points of interest as well as significantly more correct matched points of interest. As a result, FIG. 17, to be a more precise depiction of the current exemplary embodiment, should indicate two to three times the number of lines connecting points of interest between the first image and the second image than are currently illustrated.

Figure 18:
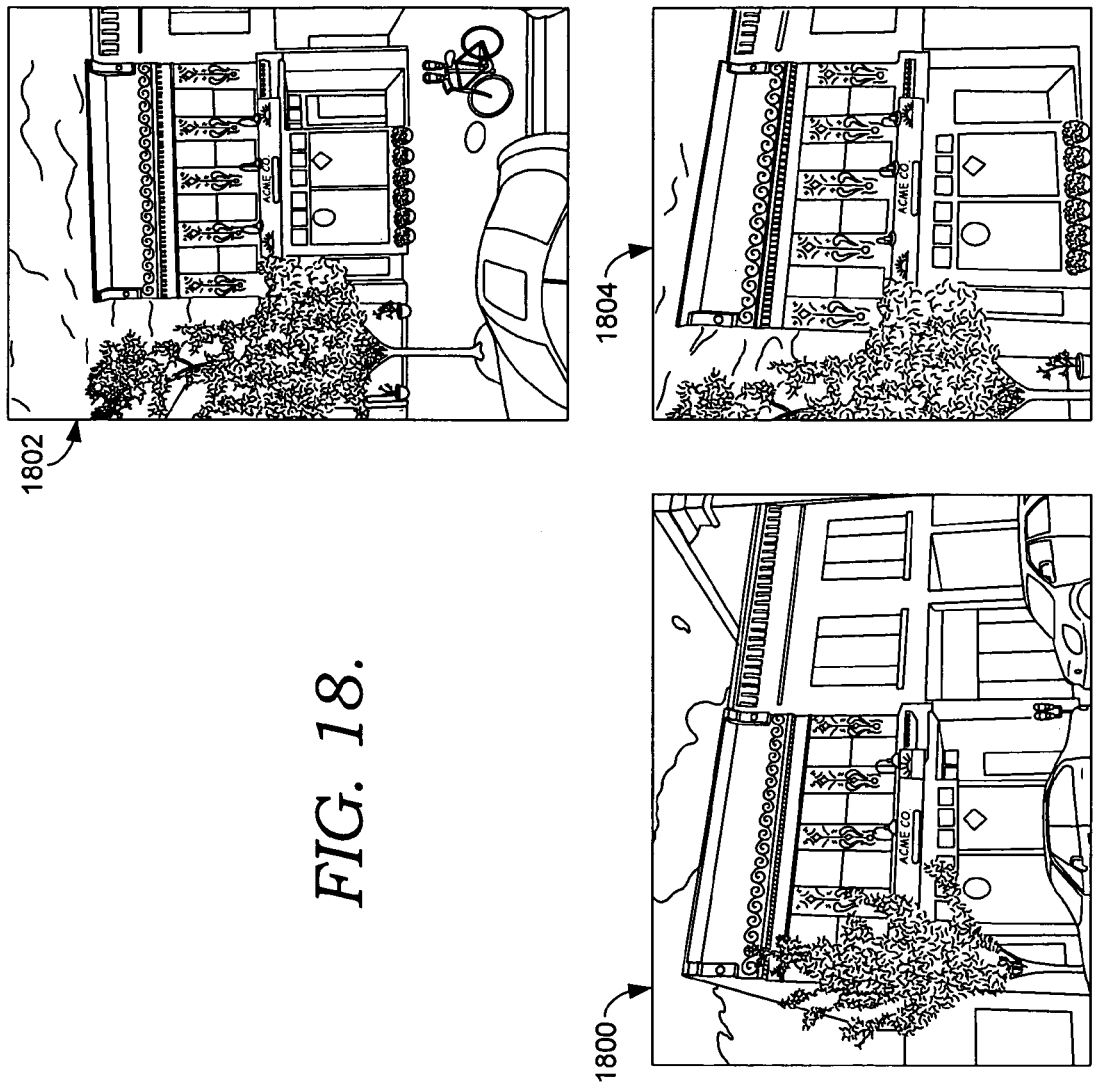
FIG. 18 depicts two original images and an adjusted image, in accordance with an embodiment of the present invention.

The geometric model can be used to project an image onto another image. Turning to FIG. 18 that depicts two original images, an image 1800 and an image 1802, as well as an adjusted image 1804. The image 1800 corresponds to the image 400 of FIG. 4, the image 1802 corresponds to the image 500 of FIG. 5. The image 1804 is a geometric model adjusted image of the image 1802. For example, a homography model that was determined in one of the feature-matching interactions may be applied to the image 1802 to result in the image 1804. As a result, the image 1804 appears to have a similar perspective as the image 1800.

Figure 19:
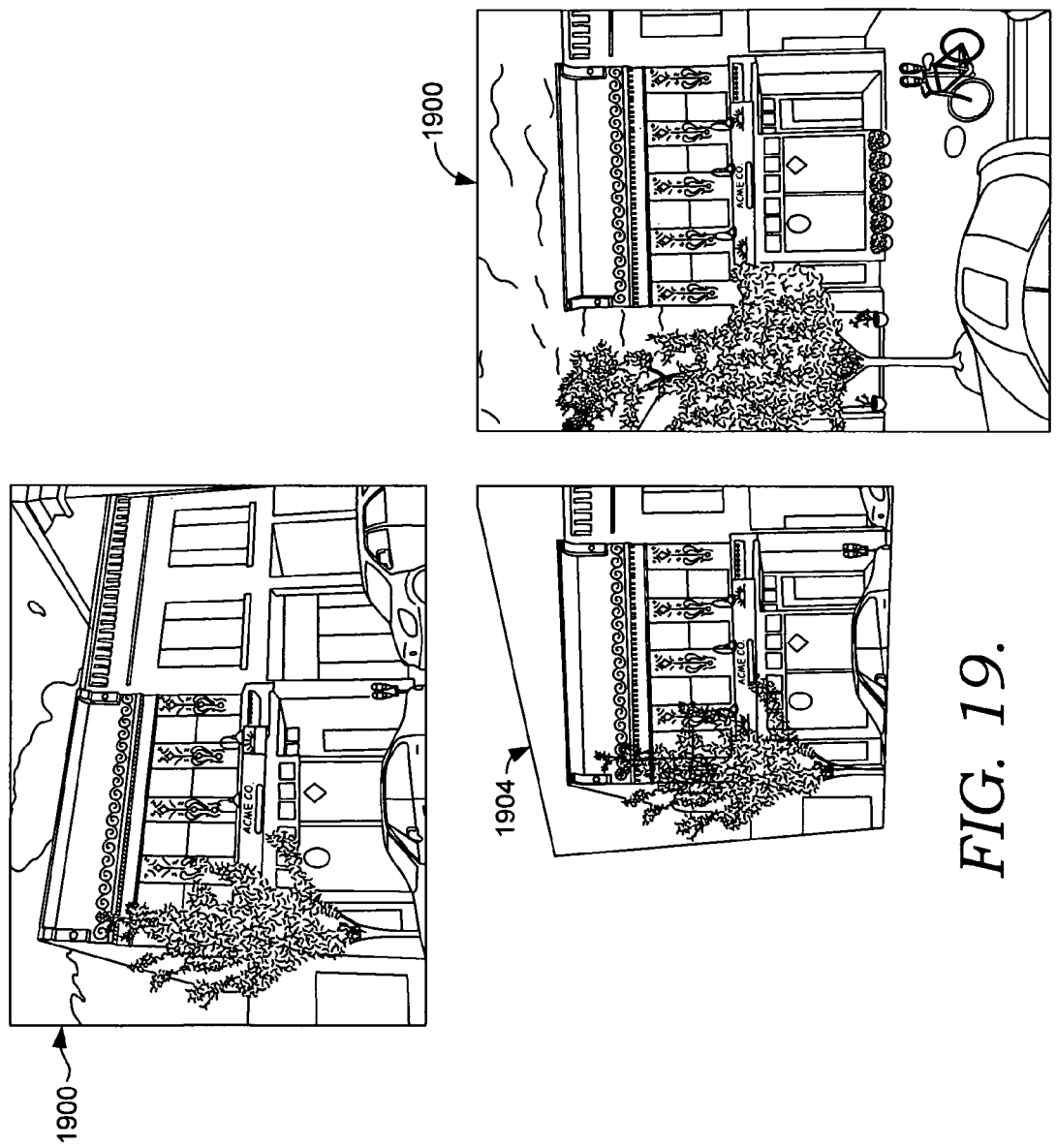
FIG. 19 depicts two original images and an adjusted image, in accordance with an embodiment of the present invention.

Turning to FIG. 19 that depicts two original images, an image 1900 and an image 1902, as well as an adjusted image 1904. The image 1900 corresponds to the image 500 of FIG. 5, the image 1902 corresponds to the image 400 of FIG. 4. The image 1904 is a geometric model adjusted image of the image 1902. For example, a homography model that was determined in one of the feature matching interactions may be applied to the image 1902 to result in the image 1904. As a result, the image 1904 appears to have a similar perspective as the image 1900.

An adjusted image illustrates the benefits of applying a geometric model to an image to compensate for deviations in images as a result of perspective. Additionally, the adjusted images may then be utilized when calculating a confidence value that two images are related.

Figure 20:
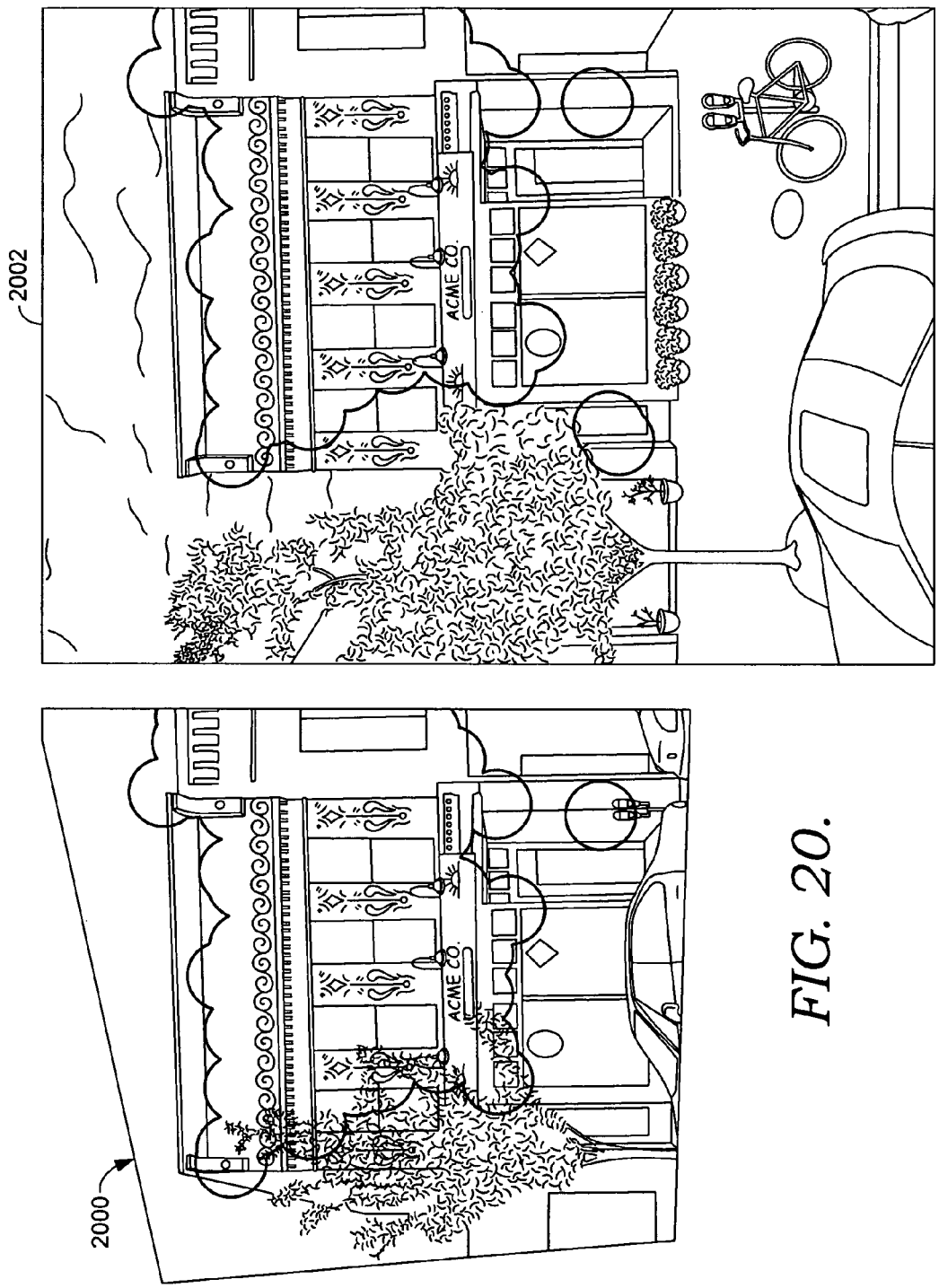
FIG. 20 depicts an original image and an adjusted image with an area of common matching points, in accordance with an embodiment of the present invention.

For example, turning to FIG. 20 that depicts an adjusted first image 2000 and a second original image 2002. The adjusted image is similar to the adjusted image 1904 of FIG. 19. The adjusted image 2000 may be projected onto the image 2002 and the matched pairs may define a plurality of areas in which the two images are found to be related. For example, an area defined by the matched pairs from a final iteration of feature matching is depicted in both images 2000 and 2002. The areas in this exemplary embodiment include a radius of a predefined size extending from each matched point. It is understood that the area surrounding each matched pair is not limited to a circular area nor a circular area of the illustrated radius. Instead, the area may be defined by any geometric shape.

A correlation coefficient may be calculated for the correlation between a first image and a second image with a particular geometric model applied to one of the images. For example, with a geometric model applied to result in the image 2000, a correlation coefficient may be calculated that explains the relationship between the image 2000 and the image 2002.

Figure 21:
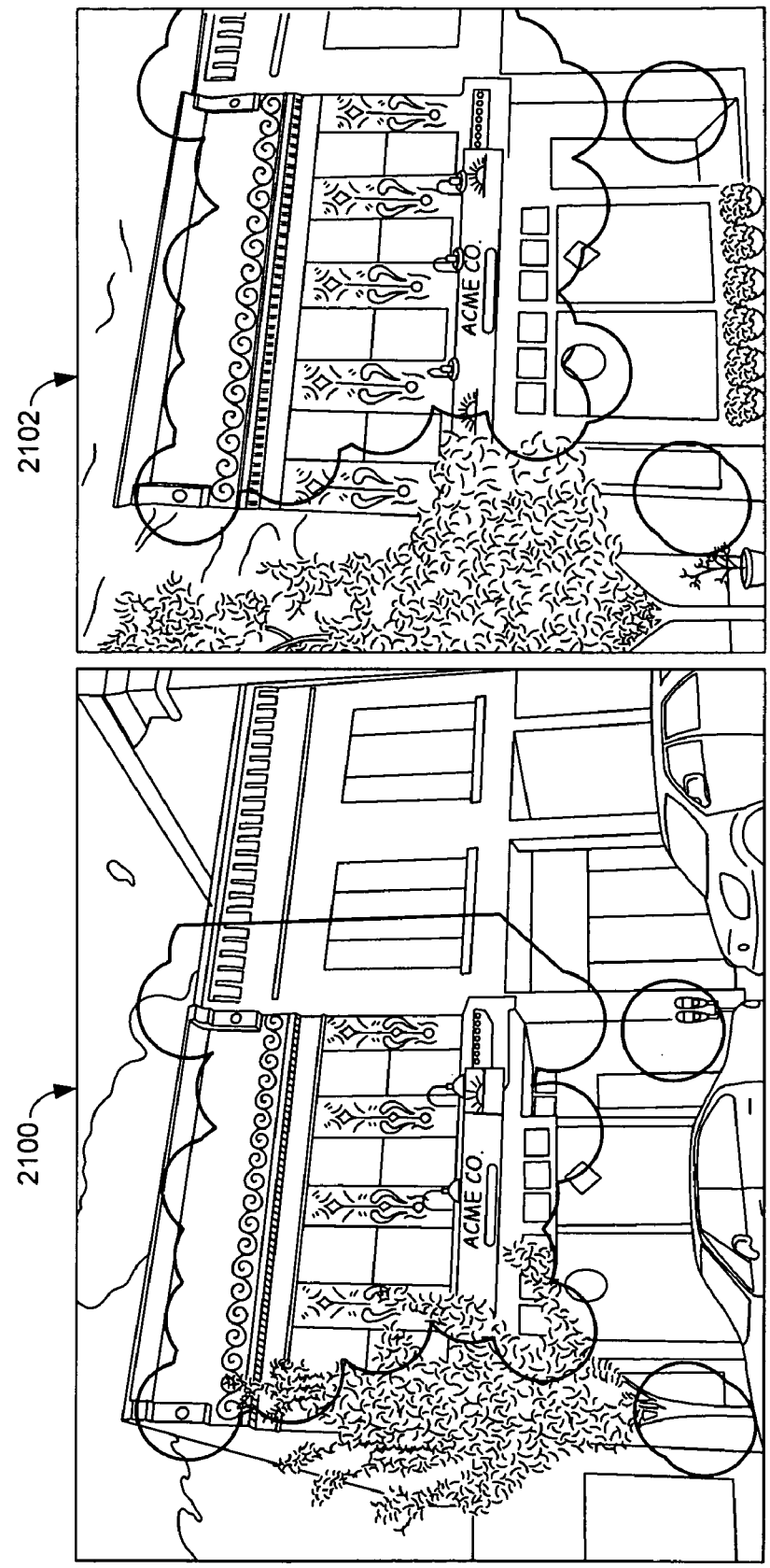
FIG. 21 also depicts an original image and an adjusted image with an area of common matching points, in accordance with an embodiment of the present invention.

Similarly, turning to FIG. 21 that depicts an original first image 2100 and an adjusted second image 2102. The adjusted image 2102 is similar to the image 1804 of FIG. 18. As discussed above, the adjusted image 2102 is adjusted based on a geometric model that was previously identified in a feature-matching iteration. As a result, the adjusted image 2102 may be projected onto the image 2100 in order for a correlation coefficient to be calculated that explains the relationship between the two images with the geometric model that has been utilized.

A different geometric model may be applied to a first image to project onto a second image than a geometric model applied to the second image to project onto the first image. Therefore, different correlation coefficient values may result between the two projections. In an exemplary embodiment, the greater of the correlation coefficient values is utilized when calculating a confidence value associated with the two images being related. Further, a correlation coefficient above a predefined threshold may indicate that the two images are related. For example, a correlation coefficient that is greater than 0.5 may indicate the two images are related.

In an exemplary embodiment, the correlation coefficients calculated for a plurality of images are below a predefined threshold even thought the images are related. This may occur when lighting conditions are varied. For example, if a first image was taken in the morning and the second image is taken in the evening, the shadows and other luminance characteristics may be substantially dissimilar. An additional correlation coefficient iteration may then be performed. The additional correlation coefficient iteration may apply a blurring effect to the edges in each image. For example, the edges of an image may be identified and then a blurring effect may then be applied to the edges, such as a Gaussian process being applied to an image of the identified edges. The addition of additional correlation coefficient iterations may therefore result in four correlation coefficient values for the potentially related images (e.g., (1) FIG. 20 format, (2) FIG. 21 format, (3) edge blurring of the images in FIG. 20, and (4) edge blurring of the images in FIG. 21). In an exemplary embodiment, the greatest correlation coefficient value may be utilized in a confidence value calculation.

An additional operation that may be performed in an exemplary embodiment to increase the confidence that images are related, includes the Euclidean distance between matched pairs. The Euclidean distance between matched pairs may be computed and evaluated to identify those matched pairs with a Euclidean distance that exceeds a predefined acceptable threshold. Therefore, additional mismatched points of interest may be removed from the matched pairs.

As previously discussed, a confidence value may be calculated to determine a first image and a second image are related. For example, a confidence value may be calculated with the greatest number of inliers for various geometric models, the maximum correlation coefficient value that has been calculated, a RMS error based on the projected location of matched pairs, and an average Euclidean distance of the feature vectors (i.e., 128 dimensional SIFT feature vectors) after applying RANSAC filtering operations.

Figure 22:
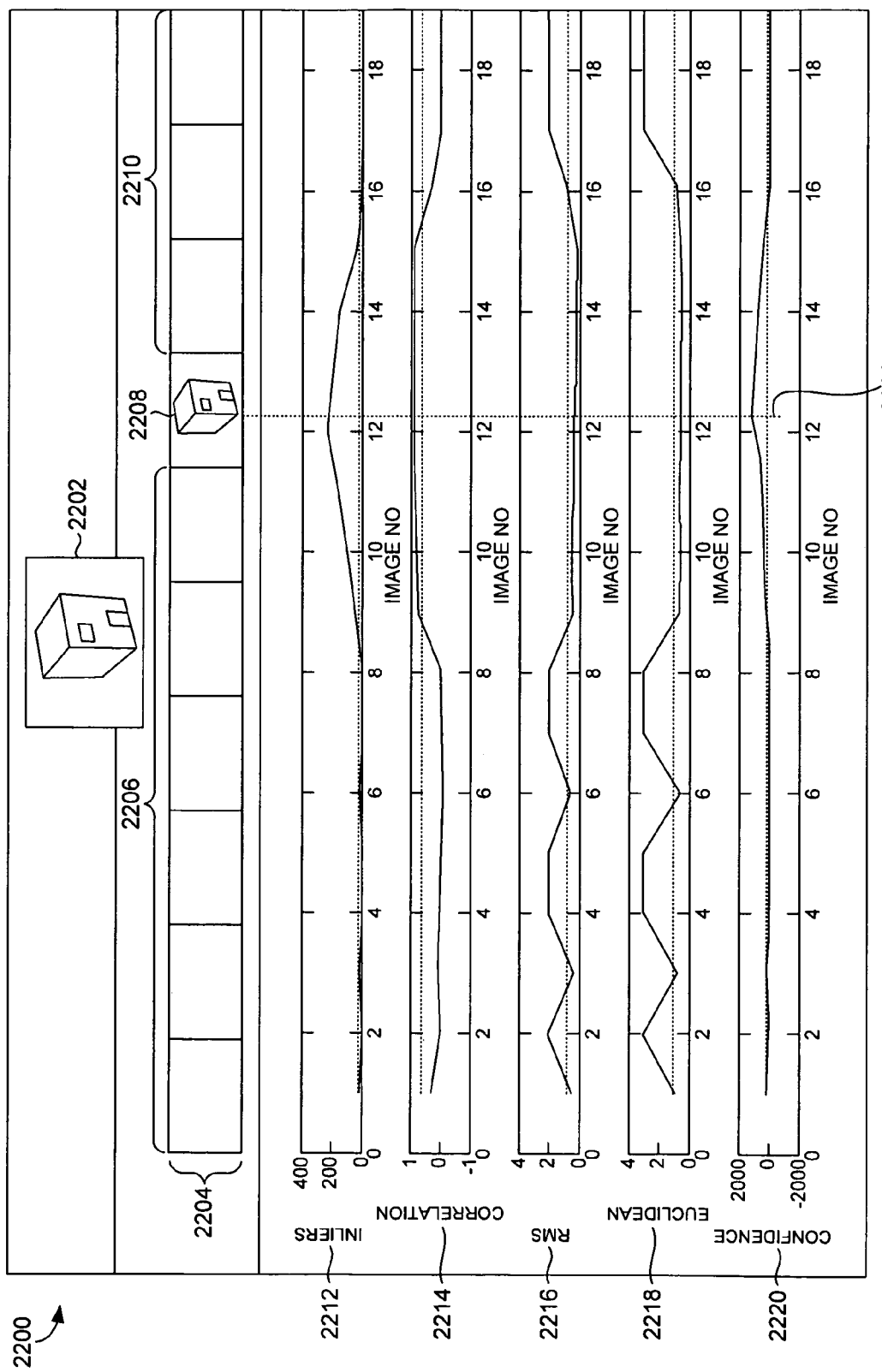
FIG. 22 depicts a selection process of identifying from a plurality of second images, an image that most relates to a first image in accordance with an embodiment of the present invention.

In addition to identifying a correct image that is related, it is also desirable in an exemplary embodiment to identify the best image related to the first image. For example, a first image that is harvested from the identity owner's website that is known to be within a particular block based on a street address previously associate with the identity may be evaluated against a plurality of images that capture the city block in which the image is expected. For example, as previously discussed, a geographic location image may have been captured by a vehicle that drives down a city block capturing images at regular intervals. The regular intervals may result in an overlap of captured targets in each image. Therefore, a plurality of the geographic location images may include an image of the target business. It may be desirable to identify the one geographic location image that is the most related. The most related geographic image may be identified by calculating a confidence value for each of the geographic location image to determine which of the images has the greatest confidence value and therefore is the most related. For example, turning to FIG. 22 that depicts a screenshot 2200 of a program attempting to identify the most related geographic image from a plurality of geographic images. A first image (i.e., identity image) 2202 is the image to which a plurality of second images 2204 are being matched. The plurality of second images includes a first set of images 2206 that correspond to images that were captured away from the target building. However, any of the images in the first set of images 2206 may include at least a portion of the target building. An image 2208 of the plurality of images 2204 captures the target building (i.e., as also captured in the first image 2202). The plurality of images 2204 also include a second set of images 2210 that also were captured away from the target building, but as before, the second set of images 2210 may also include at least a portion of the target building.

A number of metrics may be evaluated when trying to identify the most related of images. For example, an inliers metric 2212, a correlation metric 2214, an RMS metric 2216, a Euclidean distance metric 2218, and a confidence value 2220 all may be evaluated. In this example, each of the metrics are plotted for each of the plurality of images 2204. In an exemplary embodiment, the image 2208 corresponds with the highest confidence value as identified at an indication line 2222. Therefore, in this example, because the image 2208 has the greatest confidence value, the image 2208 has been identified as the most related to the first image 2202. It is contemplated additional or fewer metrics may be evaluated when determining the most related image.

Figure 23:
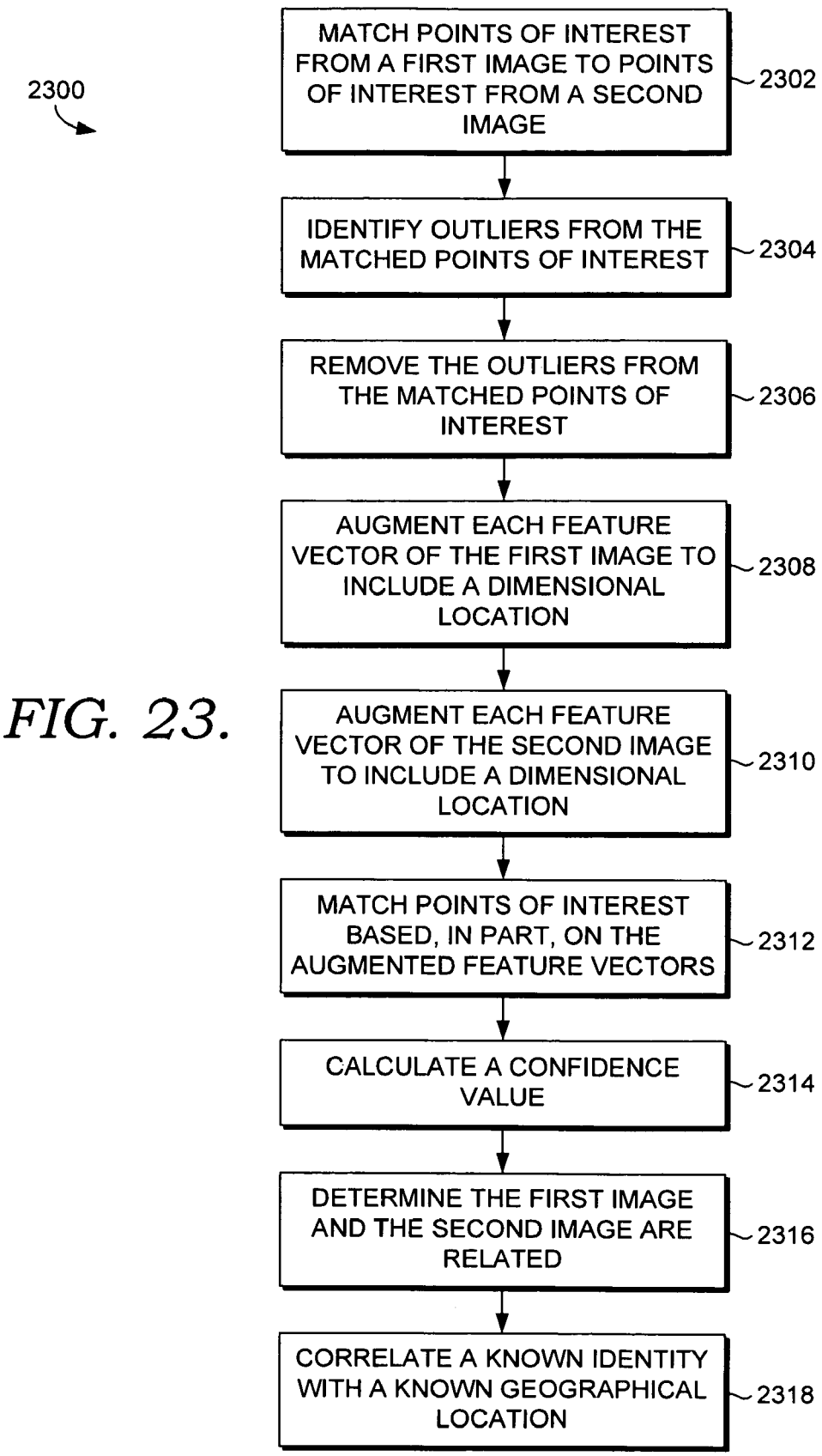
FIG. 23 depicts a block diagram illustrating a first method of associating a known geographic location with a known identity in accordance with an embodiment of the present invention.

Turning to FIG. 23 that depicts a flow diagram of a method 2300 to associate a known geographic location with a known identity, in accordance with an embodiment of the present invention. At a step 2302, points of interest are matched from a first image to points of interest from a second image. Each of the points of interest may be defined by a feature vector, such as a SIFT feature vector. The matching of points of interest, in an exemplary embodiment, is performed in at least two iterations, wherein the iterations are based, at least in part, on an orientation of feature vectors to be included in each iteration.

At a step 2304, one or more outliers are identified from the matched points of interest. In an exemplary embodiment, a geometric model such as homography, is applied to the matched points in conjunction with a RANSAC algorithm to identify the outliers. At a step 2306, outliers of the matched points of interest are removed from the matched points of interest. In an exemplary embodiment, the number of matched pairs is therefore reduced as a result of the removal of the outliers.

At a step 2308, feature vectors from a first image are augmented to include a dimensional location, such as a coordinate location. In an exemplary embodiment, the first image feature vectors of points of interest that have a corresponding point of interest in the second image after removing the outliers are augmented with a dimensional location. In yet a further exemplary embodiment, the dimensional location is a projected location of an associated point of interest, wherein the projection is accomplished by employing a geometric model.

At a step 2310, feature vectors from a second image are augmented to include a dimensional location, such as a coordinate location. In an exemplary embodiment, the second image feature vectors of points of interest that have a corresponding point of interest in the first image after having the outliers removed are augmented with a dimensional location. In yet a further exemplary embodiment, the dimensional location is a location of the points of interest within the second image.

At a step 2312, points of interest of the first image and the second image are matched, based in part, on their respective augmented feature vectors. In an exemplary embodiment, the matching of points of interest that are based, in part, on the augmented feature vectors are once again performed in a series of iterations based on the orientation of the feature vectors. For example, two or more sets of orientations may be matched at different iterations.

At a step 2314, a confidence value is calculated. In an exemplary embodiment, the confidence value is calculated based on a plurality of statistical metrics. The confidence value, in an exemplary embodiment, is utilized to determine when images are related. For example, a predefined threshold may be established to determine images are related such that when the confidence value exceeds the predefined threshold, the images are considered related. At a step 2316, the first image and the second image are determined to be related. In an exemplary embodiment, the determination is performed by a computing device.

At a step 2318, a known identity associated with one of the first image or the second image is correlated with a known geographical location of the other image. For example, the first image may have a known identity and the second image may have a known geographic location. In this example, the known identity associated with image one is correlated with the known geographic location of the second image. In an exemplary embodiment, the correlation of the known identity with the know geographic location allows a location-based search to provide the geographic location (i.e., GPS coordinates originally associated with the second image) of a known identity. In an additional exemplary embodiment, the first image may have a known geographic location and the second image may have a known identity.

Figure 24:
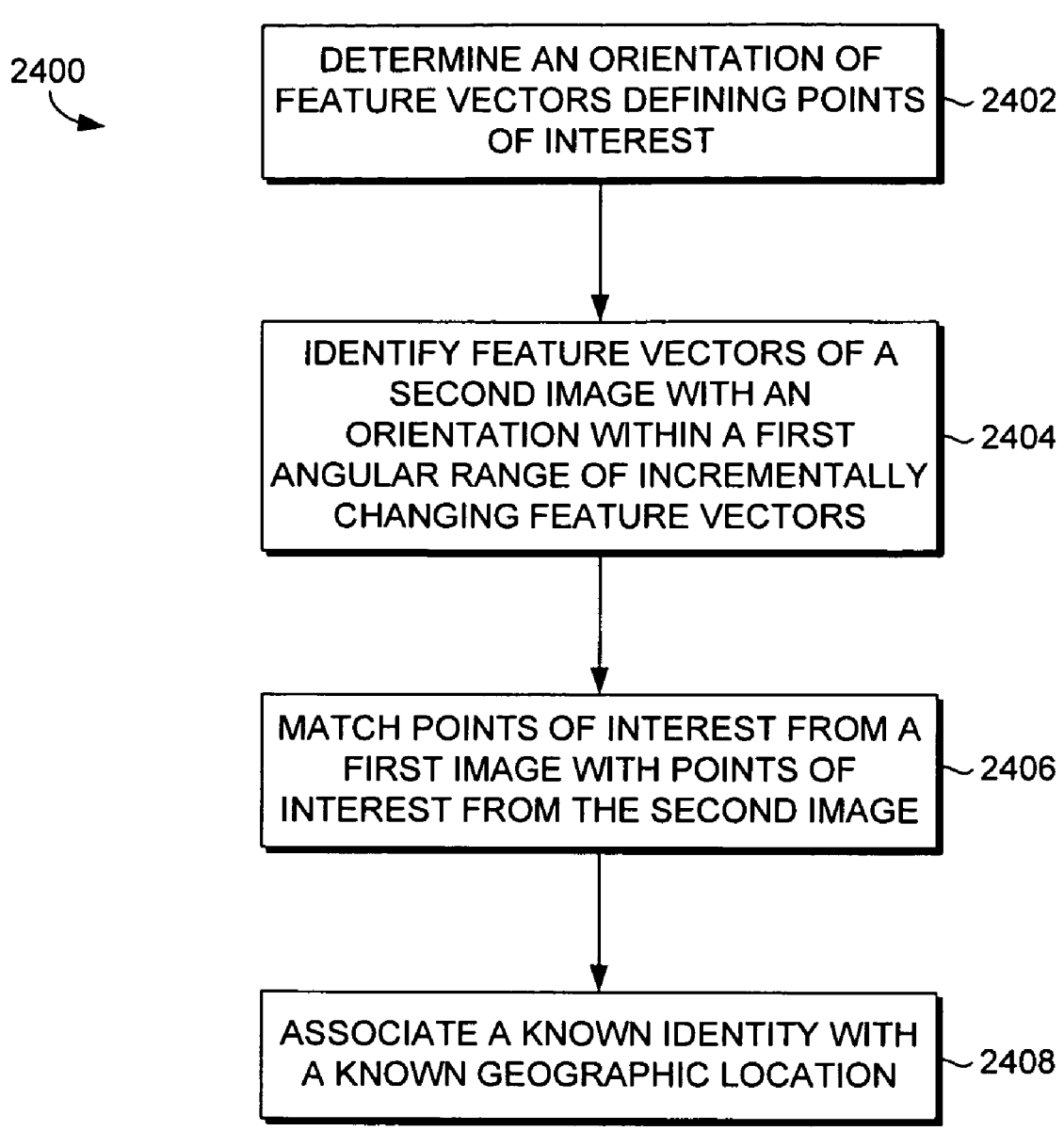
FIG. 24 depicts a block diagram illustrating a second method of associating a known geographic location with a known identity in accordance with an embodiment of the present invention.

Turning to FIG. 24 that depicts a flow diagram of a method 2400 to associate a known geographic location with a known identity, in accordance with an embodiment of the present invention. At a step 2402, an orientation of a feature vector that defines a point of interest is determined. In an exemplary embodiment, the orientation is determined utilizing SIFT. For example, the orientation may be an indication of a gradient direction at the point of interest.

At a step 2404, feature vectors of a second image that have an orientation within a first predefined angular range of incrementally changing feature vectors are identified. For example, as discussed with respect to FIG. 14 hereinabove, feature vectors of the second image that are within a predefined angular range (i.e., 22.5 degrees) of a primary orientation that incrementally changes on the first image are identified. The feature vectors of the first image incrementally change (i.e., 5-degree increments). The incremental change allows for multiple iterations of feature matching as opposed to a single iteration of feature matching. As previously discussed, incremental feature matching may be accomplished because the roll angle of the first image and the second image are below a predefined threshold, such as 30 degrees.

At a step 2406, at least one point of interest from the first image is matched with at least one point of interest from the second image. In an exemplary embodiment, the points of interest are matched based, in part, on the feature vectors of the second image that were previously identified as having an orientation within a predefined angular range.

At a step 2408, a known identity is associated with a known geographic location. In an exemplary embodiment, the known identity is associated with the first image and the known geographic location is associated with the second image. Therefore, when the first image and the second image are identified as being related, their associated metadata (e.g., known identity, known geographic location) may therefore be associated with one another.

Figure 25:
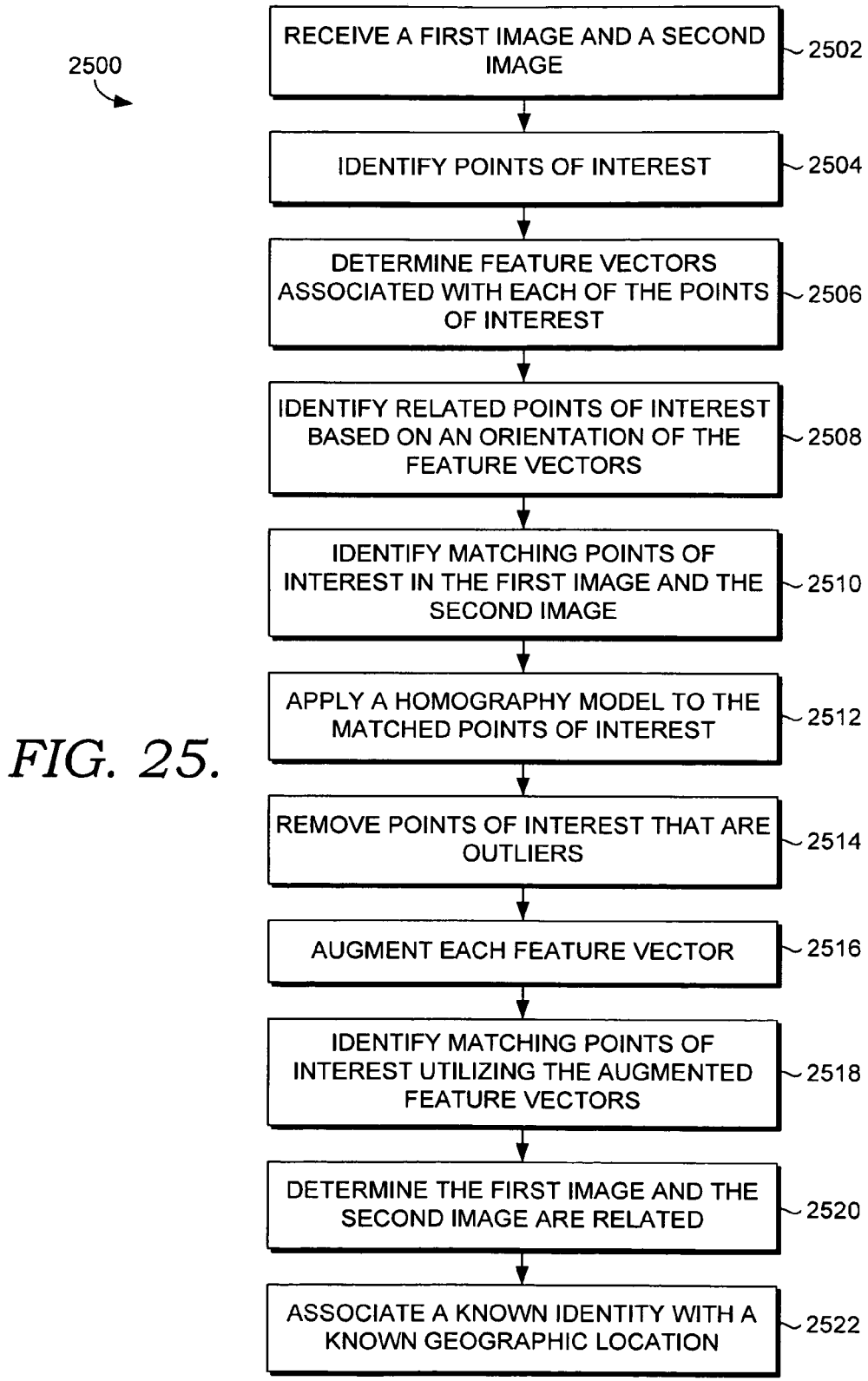
FIG. 25 depicts a block diagram illustrating a third method of associating a known geographic location with a known identity in accordance with an embodiment of the present invention.

Turning to FIG. 25 that depicts a flow diagram of a method 2500 to associate a known geographic location with a known identity, in accordance with an embodiment of the present invention. At a step 2502, a first image and a second image are received. In an exemplary embodiment, receiving an image includes harvesting an image from a data store. In an additional embodiment, the reception of an image includes populating a data store with an image from a source.

At a step 2504, one or more points of interest are identified in an image. In an exemplary embodiment, one or more points of interest are identified in the first image and one or more points of interest are identified in the second image. In an exemplary embodiment, SIFT is implemented to identify the points of interest in the image. At a step 2506, feature vectors associated with each of the points of interest are determined. For example, a feature vector is determined for each point of interest of the first image and a feature vector is determined for each point of interest of the second image. For example, SIFT may be utilized to determine feature vectors.

At a step 2508, related points of interest based on an orientation of the feature vectors are identified. For example, a point of interest may be defined by the associated feature vector. Therefore, because feature vectors are invariant to roll angle, a feature vector for a point of interest in the first image and a feature vector for the same point of interest in the second image may be similar in orientation. In an exemplary embodiment, the identification of related points of interest is performed in at least two iterations such that the orientation of the feature vectors is the basis for a point of interest's inclusion in a particular iteration.

At a step 2510, matching points of interest in the first image and the second image are identified. In an exemplary embodiment, the matching of the points is done incrementally, such that the orientation of a feature vector is the basis for a point of interest's inclusion in a particular iteration.

At a step 2512, a homography model is applied to the matched points of interest. In an exemplary embodiment, the homography model is identified by way of a RANSAC algorithm. As a result of the homography model, one or more outliers may be identified. At a step 2514, the points of interest that were identified as outliers by the homography model are removed from the matched pairs.

At a step 2516, each of the feature vectors in the remaining matched pairs are augmented. In an exemplary embodiment, the feature vectors are augmented to include a coordinate location that is based, in part, on the homography model applied at step 2512. As previously discussed, the feature vectors of the first image may be augmented with the projected coordinate location of the related point of interest and the feature vectors of the second image may be augmented with the coordinate location of the related point of interest.

At a step 2518, the augmented feature vectors are utilized to identify one or more matching points of interest. In an exemplary embodiment, the feature vectors of the first image and the feature vectors of the second image, once augmented, are evaluated to identify matching pairs of points of interest.

At a step 2520, a determination that the first image and the second image are related is made. In an exemplary embodiment, the first image and the second image are determined to be related when a statistical metric, such as a confidence value, exceeds a predefined threshold. At a step 2522, a known identity of one of the images is associated with a known geographic location. For example, if the first image is known to be Acme Co. and the second image is known to have been captured at a particular geographic coordinate, then the association that Acme Co. is located at that particular geographic location may be made. In an exemplary embodiment, the association is stored in a data store for purposes of providing relevant results to location-based searches.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of utilizing a computing device having a processor and computer-readable memory to associate a known geographic location with a known identity, the method comprising:
    matching one or more points of interest defined by feature vectors from a first image with one or more points of interest defined by feature vectors from a second image to result in a first set of matched points of interest, wherein two or more matching iterations are performed, and wherein the number of matching iterations is determined based on a predefined orientation increment;
    identifying one or more points of interest that are outliers in the first set of matched points of interest;
    removing the outliers from the first set of matched points of interest to result in a second set of matched points of interest;
    augmenting each feature vector from the first image that is associated with a point of interest included with the second set of matched points of interest, wherein the augmenting of the feature vector includes adding a dimensional location associated with a point of interest from the second image to which the feature vector is matched;
    augmenting each feature vector from the second image that is associated with a point of interest included with the second set of matched points of interest, wherein the augmenting of the feature vector includes adding a dimensional location associated with underlying points of interest;
    matching one or more points of interest defined by augmented feature vectors from a first image with one or more points of interest defined by augmented feature vectors from a second image to result in a second set of matched points of interest, wherein two or more matching iterations are performed based on a predefined range of orientations associated with augmented feature vectors;
    calculating a first confidence value based, in part, on the second set of matched points;
    determining the first image and the second image are related based on the first confidence value; and
    correlating a known identity that is associated with one of the first image or the second image with a known geographic location that is associated with the other of the first image or the second image.

2. The method of claim 1, wherein the feature vectors are Scaled-Invariant Feature Transform (SIFT) feature vectors.

3. The method of claim 2, wherein the SIFT feature vectors are defined by 128 dimensions.

4. The method of claim 1, wherein one of the first image or the second image includes metadata describing a geographic location from which the image was captured.

5. The method of claim 1, wherein a roll angle between the first image and the second image is less than 30 degrees.

6. The method of claim 1, wherein the predefined orientation increment is defined as 5 degrees.

7. The method of claim 1, wherein identifying one or more points of interest that are outliers is further comprised of applying a homography model to the matched one or more points of interest.

8. The method of claim 7, wherein the dimensional location is defined by an x-axis and a y-axis coordinate of the homography model as applied to the second image.

9. The method of claim 7, wherein the homography model is selected to fit the matched one or more points of interest utilizing a Random Sample Consensus (RANSAC) algorithm.

10. The method of claim 1, wherein the augmented feature vectors of the first image and the augmenting feature vectors of the second image are defined by 130 dimensions.

11. The method of claim 1, wherein the first confidence value is proportional to a number of inliers less a constant value, and the first confidence value is inversely proportional to an average Euclidean distance of the matched points of the second set of matched points.

12. The method of claim 1 further comprises determining a second confidence value associated with the first image and a third image, wherein the third image is captured from a different perspective than the second image.

13. The method of claim 1 further comprises updating a searchable data store with the correlation between the known identity and the known geographic location.

14. The method of claim 1, wherein the known identity is an entity name.

15. One or more computer storage media having computer-executable instructions embodied thereon for performing a method of associating a known geographic location with a known identity, the method comprising:
    determining an orientation of each of a plurality of feature vectors defining points of interest in a first image and a second image, wherein one of the first image or the second image is associated with a known identity and the other of the first image or the second image is associated with a known geographic location;
    identifying feature vectors of the second image with an orientation within a predefined angular range of incrementally changing feature vectors of the first image, wherein the feature vectors of the first image are incrementally changed based on a predefined orientation increment;
    matching at least one point of interest from the first image with at least one point of interest from the second image based, in part, on a feature vector of the second image identified with a feature vector of the first image to result in matched points of interest; and
    associating the known identity with the known geographic location.

16. The computer readable storage media having computer-executable instructions embodied thereon for performing the method of claim 15, further comprising:
    identifying a number of inliers for the matched points of interest;
    calculating a correlation coefficient for each of the matched points of interest; and
    calculating a confidence value, wherein the confidence value is based, at least in part, on the number of inliers and the correlation coefficient for each of the matched points of interest.

17. The computer readable storage media having computer-executable instructions embodied thereon for performing the method of claim 15, further comprising:
    wherein the predefined angular range is approximately 45 degrees and the predefined orientation increment is approximately 5-degrees.

18. The computer readable storage media having computer-executable instructions embodied thereon for performing the method of claim 15, further comprising:
    wherein the identifying the feature vector of the second image with an orientation within a first predefined angular range of incrementally changing feature vectors of the first image further comprises:
    identifying feature vectors of the second image with an orientation within 45 degrees of incrementally changing feature vectors of the first image, wherein the feature vectors of the first image are incrementally changed at a 5 degree increment.

19. The computer readable storage media having computer-executable instructions embodied thereon for performing the method of claim 15, further comprising:
    wherein the plurality of feature vectors defining points of interest in a first image and a second image are defined by at least 128 dimensions.

20. One or more computer storage media having computer-executable instructions embodied thereon for performing a method of associating a known geographic location with a known identity, the method comprising:
    receiving a first image and a second image, wherein one of the first image or the second image has a known identity and the other has a known geographic location;
    identifying points of interest, wherein identifying points of interest comprises:
        identifying a first plurality of interest points of the first image, and identifying a second plurality of interest points of the second image;
    determining feature vectors associated with each of the points of interest, wherein determining feature vectors comprises:
        determining a feature vector for each of the first plurality of interest points resulting in a first plurality of feature vectors, and determining a feature vector for each of the second plurality of interest points resulting in a second plurality of feature vectors;
    identifying related points of interest based on an orientation of the feature vectors, wherein identifying the orientation of the feature vectors comprises:
        identifying a first orientation selection comprised of one or more of the second plurality of feature vectors having an orientation within a predefined angular range of a first selection of the first plurality of interest points, and
        identifying a second orientation selection comprised of one or more of the second plurality of feature vectors having an orientation within the predefined angular range of a second selection of the first plurality of interest points;
    identifying matching point of interest in the first image and the second image, wherein identifying matching points of interest comprises:
        matching one or more of the first selection of the first plurality of interest points with one or more of the first orientation selection, and
        matching one or more of the second selection of the first plurality of interest points with one or more of the second orientation selection;
    applying a homography model to the matched points of interest to identify one or more points of interest that are outliers of the matching points of interest;
    removing the one or more points of interest that are outliers to result in a first selection of matched points of interest;
    augmenting each feature vector associated with the first selection of matched points of interest, wherein a feature vector of a point of interest associated with the first image is augmented with a location of a corresponding matched point of interest of the second image, and wherein a feature vector of a point of interest associated with the second image is augmented with a location of the point of interest associated with the second image;

identifying matching points of interest in the first image and the second image utilizing the augmented feature vectors;

determining the first image and the second image are related, wherein the first image and the second image are related when a confidence value is above a predefined threshold; and associating the known identity with the known geographic location.

\* \* \* \* \*